United States Patent
Kubota et al.

(10) Patent No.: US 11,886,738 B2
(45) Date of Patent: Jan. 30, 2024

(54) MEMORY SYSTEM AND MEMORY CONTROL METHOD

(71) Applicant: Kioxia Corporation, Tokyo (JP)

(72) Inventors: Takahiro Kubota, Kawasaki Kanagawa (JP); Hironori Uchikawa, Fujisawa Kanagawa (JP); Yuta Kumano, Kawasaki Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/887,873

(22) Filed: Aug. 15, 2022

(65) Prior Publication Data
US 2023/0297273 A1 Sep. 21, 2023

(30) Foreign Application Priority Data
Mar. 17, 2022 (JP) .................. 2022-043111

(51) Int. Cl.
G06F 3/06 (2006.01)
(52) U.S. Cl.
CPC .......... *G06F 3/0658* (2013.01); *G06F 3/0619* (2013.01); *G06F 3/0679* (2013.01)
(58) Field of Classification Search
CPC .... G06F 3/0658; G06F 3/0619; G06F 3/0679; G06F 11/1048; G06F 11/1044; G06F 11/1012
See application file for complete search history.

(56) References Cited

U.S. PATENT DOCUMENTS

| | | | |
|---|---|---|---|
| 6,763,494 B2 | 7/2004 | Hewitt | |
| 7,162,684 B2 | 1/2007 | Hocevar | |
| 2007/0043997 A1* | 2/2007 | Yang | H03M 13/2903 714/758 |
| 2007/0044006 A1* | 2/2007 | Yang | G11B 20/1833 714/785 |

(Continued)

FOREIGN PATENT DOCUMENTS

JP 2021-111826 A 8/2021

*Primary Examiner* — Hiep T Nguyen
(74) *Attorney, Agent, or Firm* — Foley & Lardner LLP

(57) ABSTRACT

A memory controller determines the number of pieces of correction information of an a-th correction information for each of M component codes according to a value based on the number of component codes, and determines a correction information address which is an address on a correction information memory of the a-th correction information based on the number of pieces of correction information. The memory controller calculates an a-th soft-input value for an a-th component code, inputting the a-th soft-input value to execute decoding processing of the a-th component code, calculates a decoded word of the a-th component code, a-th correction information, and a-th reliability information, stores the a-th correction information and b-th correction information indicating a b-th corrected location ($1 \leq b \leq nj$) in a j-th dimension ($j \neq i$, $1 \leq j \leq N$) in the correction information address of the correction information memory, stores a-th reliability information in a reliability information memory, and outputs an output decoded word calculated from the read information and the reliability information of each component code.

12 Claims, 20 Drawing Sheets

(56) References Cited

U.S. PATENT DOCUMENTS

| | | | |
|---|---|---|---|
| 2008/0098280 A1* | 4/2008 | Andersen | G11B 20/18 |
| | | | 714/766 |
| 2012/0005560 A1* | 1/2012 | Steiner | H03M 13/2918 |
| | | | 714/780 |
| 2014/0219001 A1* | 8/2014 | Patapoutian | G11C 13/0033 |
| | | | 365/148 |
| 2017/0187395 A1* | 6/2017 | Watanabe | H03M 13/2927 |
| 2019/0087107 A1 | 3/2019 | Watanabe | |
| 2019/0286517 A1* | 9/2019 | Watanabe | H03M 13/3707 |
| 2020/0293400 A1* | 9/2020 | Steiner | G11C 29/52 |
| 2021/0211142 A1 | 7/2021 | Hyodo et al. | |
| 2022/0209791 A1* | 6/2022 | Steiner | H03M 13/118 |
| 2022/0261312 A1 | 8/2022 | Kubota et al. | |
| 2023/0083269 A1 | 3/2023 | Kumano et al. | |
| 2023/0089702 A1* | 3/2023 | Uchikawa | H03M 13/159 |
| | | | 714/758 |

* cited by examiner

FIG. 19

| NUMBER OF COMPONENT CODES | NUMBER OF PIECES OF CORRECTION INFORMATION PER ONE CYCLE OF COMPONENT CODES | TOTAL NUMBER OF PIECES OF CORRECTION INFORMATION |
|---|---|---|
| 100 | 30 | 3000 |
| 150 | 20 | 3000 |
| 200 | 15 | 3000 |
| 250 | 12 | 3000 |
| 300 | 10 | 3000 |
| 350 | 8 | 2800 |
| 400 | 7 | 2800 |
| 500 | 6 | 3000 |

FIG. 21

| NUMBER OF UNCORRECTED COMPONENT CODES | NUMBER OF PIECES OF CORRECTION INFORMATION PER ONE CYCLE OF COMPONENT CODES | TOTAL NUMBER OF PIECES OF CORRECTION INFORMATION |
|---|---|---|
| 87 | 33 | 2871 |
| 125 | 23 | 2875 |
| 170 | 17 | 2890 |
| 218 | 13 | 2834 |
| 269 | 10 | 2690 |
| 327 | 9 | 2943 |
| 394 | 7 | 2758 |

FIG. 22

|  | 1<br>1 | COMPLETED<br>2 | COMPLETED<br>3 | COMPLETED<br>4 | 2<br>5 | 3<br>6 | COMPLETED<br>7 | 4<br>8 |
|---|---|---|---|---|---|---|---|---|
| COMPLETED 1 | | | | | | | | |
| COMPLETED 2 | | | | | | | | |
| COMPLETED 3 | | | | | | | | |
| COMPLETED 4 | | | | | | | | |
| 1 5 | | | | | | | | |
| 2 6 | | | | | | | | |
| COMPLETED 7 | | | | | | | | |
| 3 8 | | | | | | | | |

MEMORY SYSTEM AND MEMORY CONTROL METHOD

CROSS-REFERENCE TO RELATED APPLICATION

This application is based upon and claims the benefit of priority from Japanese Patent Application No. 2022-043111, filed Mar. 17, 2022, the entire contents of which are incorporated herein by reference.

FIELD

Embodiments described herein relate generally to a memory system and memory control method.

BACKGROUND

In a memory system, error-correction coded data is generally stored in order to protect stored data. Therefore, when reading the data stored in the memory system, the error-correction coded data is decoded.

DESCRIPTION OF THE DRAWINGS

FIG. 19 is a diagram showing an example of the number of pieces of correction information.

FIG. 21 is a diagram showing an example of the number of pieces of correction information.

FIG. 22 is a diagram illustrating an example of correspondence information.

DETAILED DESCRIPTION

At least one embodiment provides a memory system capable of reducing the amount of memory required for decoding.

In general, according to at least one embodiment, a memory controller determines the number of pieces of correction information of an a-th correction information for each of M component codes according to a value based on the number of component codes, and determines a correction information address which is an address on a correction information memory of the a-th correction information based on the number of pieces of correction information. The memory controller calculates an a-th soft-input value for an a-th component code, inputting the a-th soft-input value to execute decoding processing of the a-th component code, calculates a decoded word of the a-th component code, a-th correction information, and a-th reliability information, stores the a-th correction information and b-th correction information indicating a b-th corrected location ($1 \leq b \leq nj$) in a j-th dimension ($j \neq i$, $1 \leq j \leq N$) in the correction information address of the correction information memory, stores a-th reliability information in a reliability information memory, and outputs an output decoded word calculated from the read information and the reliability information of each component code.

The memory system according to embodiments will be described in detail with reference to the accompanying drawings. The present disclosure is not limited to the following embodiments.

In recent years, memory systems using non-volatile memory such as NAND flash memory (hereinafter, simply referred to as NAND memory) are used in various places by taking advantage of the high speed thereof. However, the data read from the non-volatile memory may contain an error due to the passage of time after being stored in the non-volatile memory, noise generated during reading/writing, and the like. Therefore, in general, an encoding processing using an error-correction code is executed on the data stored in the non-volatile memory, and decoding processing using the error-correction code is executed at the time of reading to remove the error contained in the read data.

Figure 1:
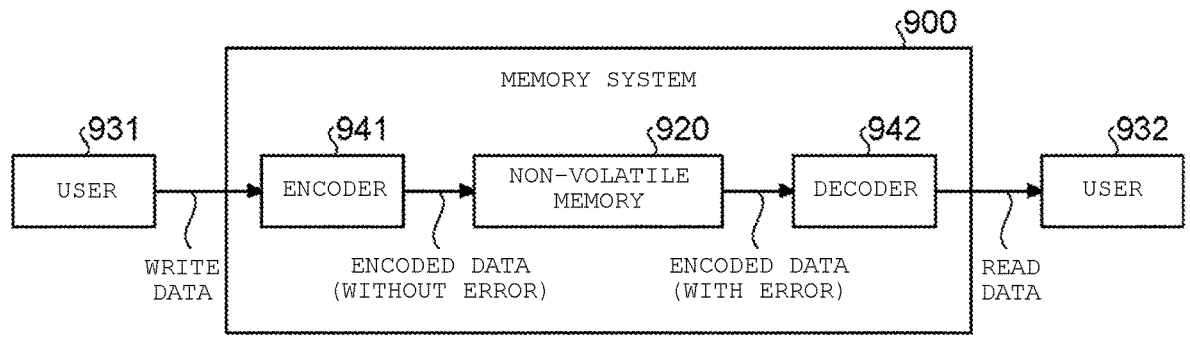
FIG. 1 is a diagram illustrating an operation of protecting data with an error-correction code.

FIG. 1 is a diagram illustrating an operation of protecting data in a memory system according to a comparative example with an error-correction code. A user 931 and a user 932 may be information processing devices such as a personal computer, a server device, a portable information device, and a digital still camera, respectively.

The user 931 transmits data to be written (hereinafter, referred to as write data) to a memory system 900. The memory system 900 encodes the write data received from the user 931 by using an encoder 941 and writes the coded data (codeword) generated thereby to the non-volatile memory 920. Therefore, the coded data written in a non-volatile memory 920 basically does not contain an error.

The coded data stored in the non-volatile memory 920 is read, for example, in response to a read request from the user 932. Here, the read coded data may contain an error. Therefore, the original codeword is restored by executing the decoding while removing the error contained in the read coded data by using a decoder 942. Thereafter, the original codeword or the restored uncoded write data is transmitted to the user 932. The user 932 that issued the read request may be the same user as the user 931 that issued the write request, or may be another user.

Here, it is assumed that the encoder 941 encodes the write data into a codeword composed of binary information (bits) expressed by '0' or '1', and that the codeword is stored in the non-volatile memory 920 as binary information. Hereinafter, when reading data from the non-volatile memory 920, when the stored data is read as binary information indicating whether it is '0' or '1' and input to the decoder 942, the input information is referred to as hard-input. When the stored data is read out as information on the probability of being '0' or the probability of being '1' and input to the decoder 942, the probability information is referred to as soft-input.

Further, when the decoding result output by the decoder 942 is binary information as to whether the original write data is '0' or '1', the output information is referred to as hard-output. When the decoding result output by the decoder 942 includes the probability information of whether the original write data is '0' or '1', the output information is referred to as soft-output.

A soft-input soft-output (SISO) decoder that receives such a soft-input and outputs a soft-output is used, for example, as a component code decoder for a multidimensional error-correction code.

Here, the multidimensional error-correction code refers to a symbol in which at least one or more constituent units of an error-correction code are multiple protected by a plurality of smaller component codes. Further, one symbol is composed of, for example, 1 bit (element of binary field) or an alphabetic element such as a finite field other than a binary field. In order to facilitate the description, an error-correction code of a binary field in which one symbol is composed of 1 bit will be described below as an example. There may be places in the description where symbols and bits are mixed, but both have the same meaning.

Figure 2:
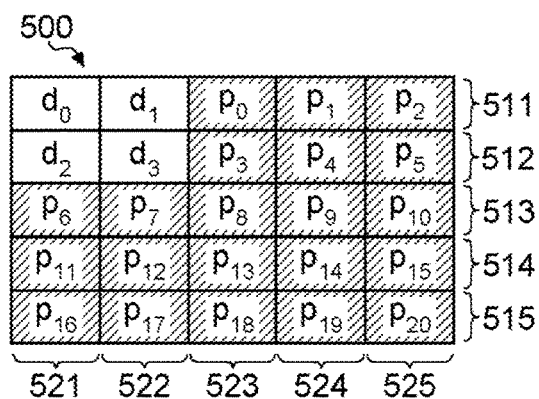
FIG. 2 is a diagram showing an example of a product code.

As an example of a multidimensional error-correction code, a product code is shown in FIG. 2. In a product code 500 shown in FIG. 2, each information symbol $d_0$ to $d_3$, which is a constituent unit, has a structure protected by Hamming codes 511 to 515 and 521 to 525 having an information length of 2 symbols and a parity length of 3 symbols, respectively, in a row direction (horizontal direction in the drawing) and a column direction (vertical direction in the drawing). In such a product code 500, all the information symbols $d_0$ to $d_3$ and parity symbols $p_0$ to $p_{20}$ are doubly protected by the Hamming code in the row direction and the Hamming code in the column direction. In the product code shown in FIG. 2, all symbols are doubly protected by component codes in the row direction (referred to as dimension 1) and the column direction (referred to as dimension 2). The multidimensional error-correction code is not limited thereto, and may be, for example, a generalized low density parity check code (LDPC). In general multidimensional error-correction codes including generalized LDPC codes, the multiplicity of protection may be different for each symbol, and the component codes cannot be grouped as in dimension 1 and dimension 2, but the present technology is applicable to such a code configuration.

In the following, for the sake of simplicity, an example of using a two-dimensional error-correction code in which each symbol is protected by two component codes that can be grouped into dimension 1 and dimension 2 will be described. Each component code in each dimension contains one or more component codes defined for each dimension. In the following, a component code corresponding to each dimension containing one or more component codes may be referred to as a component code group. For example, a dimension 1 component code group and a dimension 2 component code group include n1 component codes and n2 component codes, respectively. The applicable error-correction code is not limited thereto, and may be an N-dimensional error-correction code in which at least one of the symbols constituting the code is protected by N component code groups (N is an integer of 2 or more). When expressed by the number of component codes included in each component code group, the N-dimensional error-correction code is protected by M component codes (M is the sum of ni ($1 \leq i \leq N$), N is an integer of 2 or more, and ni is the number of component codes in an i-th dimension).

Figure 3:
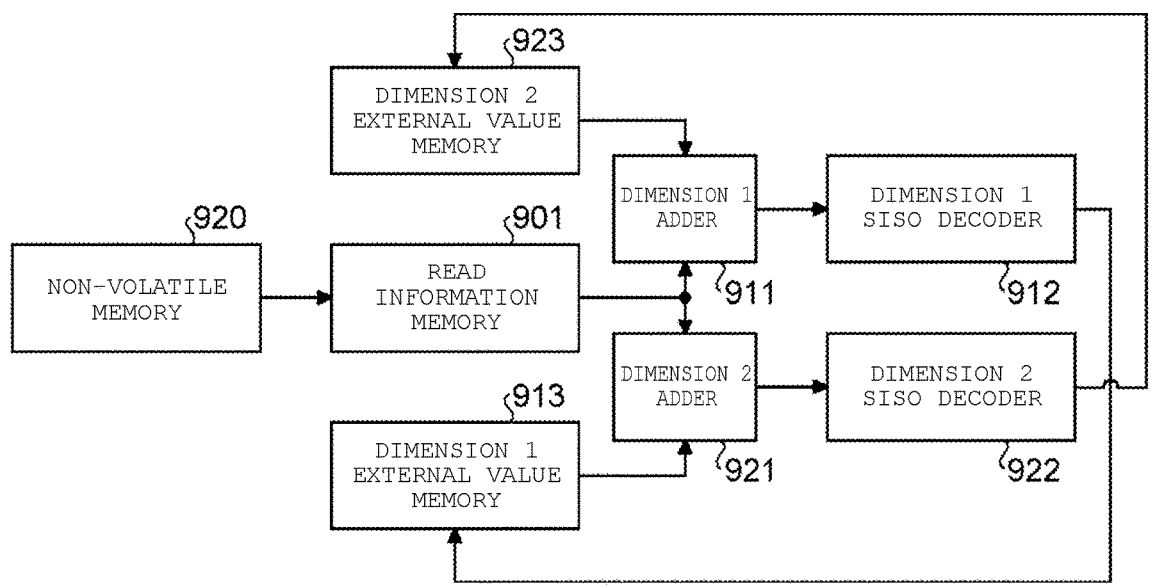
FIG. 3 is a block diagram showing an example of a functional block that executes turbo decoding on a two-dimensional error-correction code.

Turbo decoding can be performed on such a multidimensional error-correction code. FIG. 3 is a diagram showing an example of a functional block that executes turbo decoding on a two-dimensional error-correction code. Further, FIG. 4 is a flowchart showing an example of the processing flow by the functional block shown in FIG. 3.

As shown in FIG. 3, the functional block that performs turbo decoding on the two-dimensional error-correction code includes a read information memory 901, a dimension 1 adder 911, a dimension 1 SISO decoder 912, a dimension 1 external value memory 913, a dimension 2 adder 921, a dimension 2 SISO decoder 922, and a dimension 2 external value memory 923.

Figure 4:
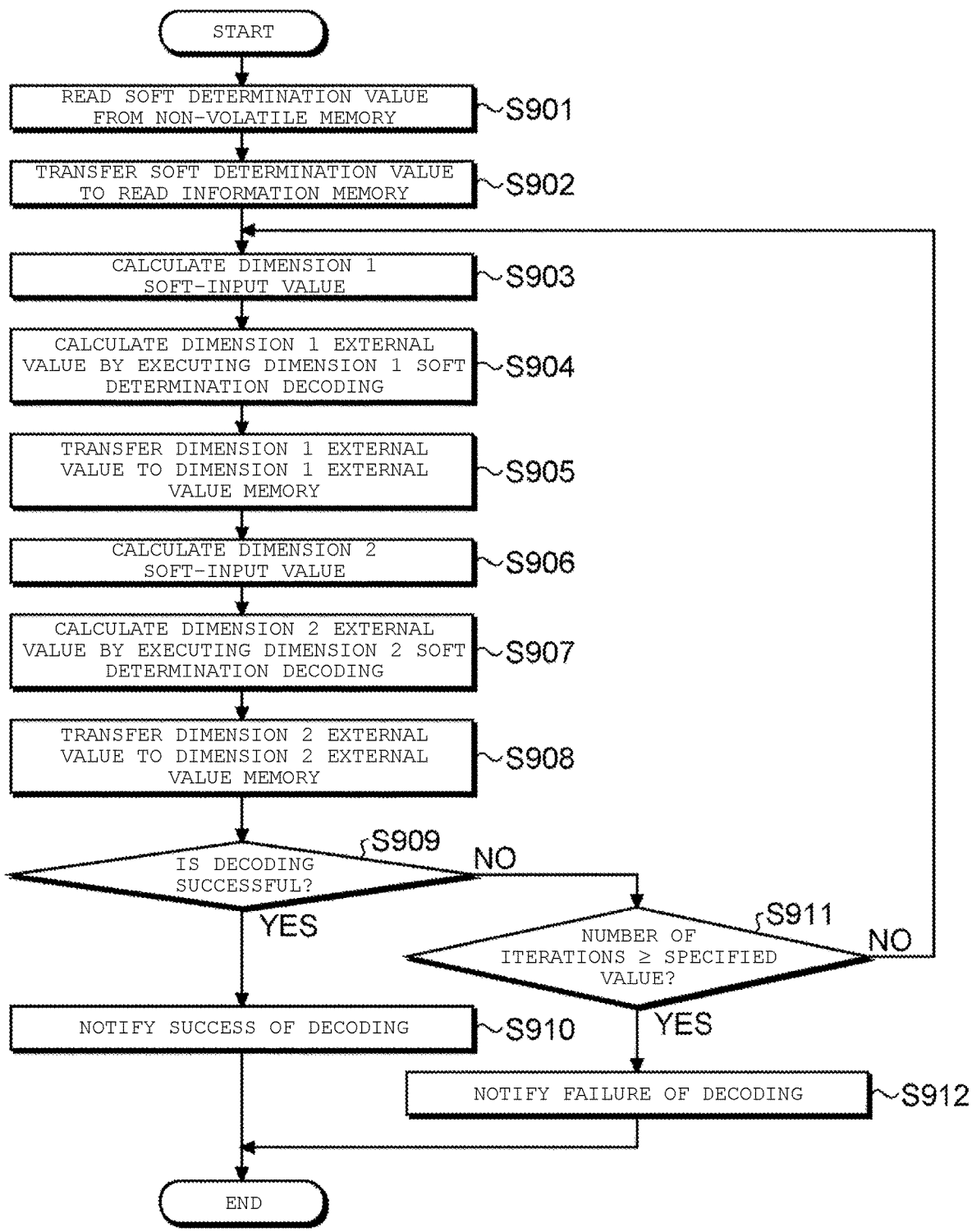
FIG. 4 is a flowchart of a processing flow according to the functional block shown in FIG. 3.

In the turbo decoding operation by such a functional block, as shown in FIG. 4, first, the error-correction code is read from the non-volatile memory 920 with a soft determination value (step S901). The read error-correction code of the soft determination value is transferred to the read information memory 901 as read information and stored (step S902).

Next, the read information in the read information memory 901 and the dimension 2 external value in the dimension 2 external value memory 923 are added by the dimension 1 adder 911, whereby a dimension 1 soft-input value (=read information+dimension 2 external value) is calculated (step S903). It is assumed that both the dimension 1 external value memory 913 and the dimension 2 external value memory 923 are reset (zero cleared) at the start of the present operation.

Subsequently, the dimension 1 soft-input value calculated by the dimension 1 adder 911 is input to the dimension 1 SISO decoder 912 for each component code. The dimension 1 SISO decoder 912 calculates the dimension 1 external value by executing the dimension 1 soft determination decoding on the input dimension 1 soft-input value (step S904). The calculated dimension 1 external value is transferred to the dimension 1 external value memory 913 and stored (step S905).

Next, the read information in the read information memory 901 and the dimension 1 external value in the dimension 1 external value memory 913 are added by the dimension 2 adder 921, whereby a dimension 2 soft-input value (=read information+dimension 1 external value) is calculated (step S906).

Subsequently, the dimension 2 soft-input value calculated by the dimension 2 adder 921 is input to the dimension 2

SISO decoder 922 for each component code. The dimension 2 SISO decoder 922 calculates the dimension 2 external value by executing the dimension 2 soft determination decoding on the input dimension 2 soft-input value (step S907). The calculated dimension 2 external value is transferred to the dimension 2 external value memory 923 and stored (step S908).

Next, it is determined whether or not the decoding is successful (step S909). Successful decoding may mean, for example, that a decoded word that can be determined to be correct is found. When the decoding is successful (YES in step S909), the external control unit or the like is notified of the decoded word found with the success of the decoding (step S910), and the present operation ends. Meanwhile, when the decoding is not successful (NO in step S909), it is determined whether or not the number of iterations of the present operation reaches a preset specified value (step S911), and when the specified value is not reached (NO in step S911), the processing returns to step S903 and the subsequent operations are executed. Further, when the specified value is reached (YES in step S911), the failure of decoding is notified to the external control unit or the like (step S912), and the present operation ends. The number of iterations may be, for example, the number of times the operations of steps S903 to S908 of FIG. 4 are repeated.

A Maximum A Posteriori (Max-log-MAP) decoder that adopts a decoding algorithm that calculates an external value can be used for the dimension 1 SISO decoder 912 and the dimension 2 SISO decoder 922 in the configuration shown in FIG. 3. The Max-log-MAP decoder is a decoder that calculates the posterior probability value for each bit from the MAP decoded word and the opposite decoded word of each bit. For the sake of simplification of the description, the quantity proportional to a posterior probability and the approximate value thereof will also be referred to as posterior probabilities hereafter. For example, assuming that the prior probabilities of all codewords are equal, the likelihood of the decoded word is a quantity proportional to the posterior probability value of the decoded word.

Here, a MAP decoded word c* refers to a codeword $c^*=\text{argmax}_c P(c|S)$ having a highest posterior probability P calculated from a soft-input value S among all the codewords $c \in C$. The opposite decoded word of the i-th bit is calculated from the soft-input value S among the codewords having a value different from the MAP decoded word c* in the i-th bit among all the codewords c E C refers to a codeword $c_{p,i}=\text{argmax}_c P(c|S, c_i \neq c^*_i)$ having the highest posterior probability P. Therefore, in the intermediate hard determination value calculated in the middle of decoding by the Max-log-MAP decoder, the MAP decoded word c* and all opposite codewords $c_{p,i}$ is included.

In addition, instead of the set C of all codewords, a set $C' \subset C$ of codewords having a relatively high posterior probability may be used. In that case, an approximate MAP decoded word and an approximate opposite decoded word of the i-th bit are obtained. Max-log-MAP decoding using such a codeword subset C' is inferior in correction ability to Max-log-MAP decoding using all codeword sets C, but the amount of calculation is reduced, therefore decoding can be performed at high speed. For the sake of simplification of the description, the term MAP decoded word will be used hereafter, including a case where an approximate MAP decoded word is used.

In Max-log-MAP decoding using the codeword subset C', a logarithmic posterior probability ratio R of the i-th bit is approximately calculated from the posterior probability ratios of the MAP decoded word c* and the opposite decoded words $c_{p,i}$ using the following Equation (1).

[Equation 1]

$$R = (1 - 2c_i)\ln\left(\frac{P(c^*|S)}{P(c_{p,i}|S)}\right) \quad (1)$$

The external value of each dimension can be obtained by subtracting the soft-input value $S_i$ of each dimension from the logarithmic posterior probability ratio R obtained by Equation (1). In the present description, Max-log-MAP decoding is given as an example of a decoding algorithm that calculates an external value from an intermediate hard determination value calculated in the middle of decoding, but various decoding algorithms may be used other than that.

Since a turbo decoder using the SISO decoder as described above store the external value which is the probability information in the external value memory, the amount of memory required for decoding may increase. Further, an increase in the amount of memory required for decoding means an increase in the amount of memory accessed during the decoding processing, which causes a decrease in the decoding speed and an increase in the current consumption. Therefore, it is desired to provide a memory system capable of reducing the amount of memory required for decoding.

First Embodiment

Figure 5:
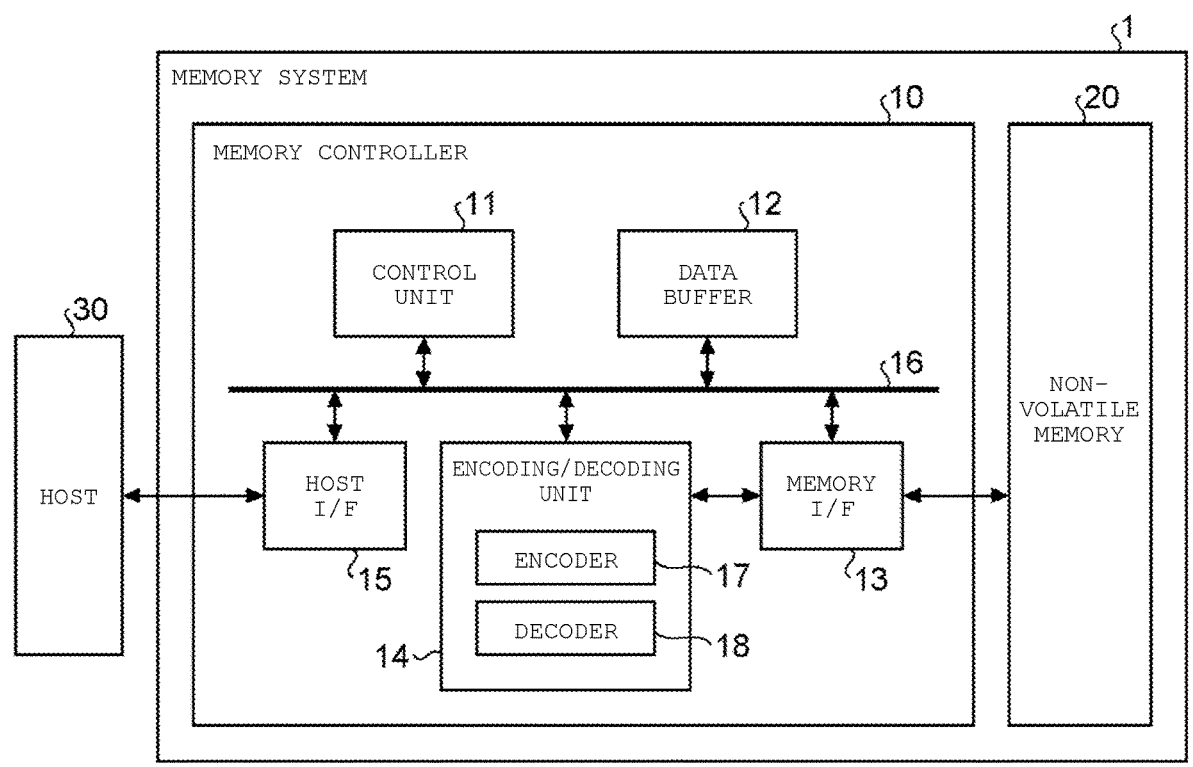
FIG. 5 is a block diagram of a memory system according to at least one embodiment.

FIG. 5 is a block diagram showing a schematic configuration example of a memory system according to a first embodiment. As shown in FIG. 5, a memory system 1 includes a memory controller 10 and a non-volatile memory 20. The memory system 1 can be connected to a host 30, and FIG. 5 shows a state in which the memory system 1 is connected to the host 30. The host 30 may be, for example, an electronic device such as a personal computer or a mobile terminal.

The non-volatile memory 20 is a non-volatile memory that stores data in a non-volatile way, and is, for example, a NAND memory. In the following description, a case where a NAND memory is used as the non-volatile memory 20 is illustrated, but as the non-volatile memory 20, it is also possible to use a memory device other than the NAND memory such as a three-dimensional structure flash memory, resistance random access memory (ReRAM), and ferroelectric random access memory (FeRAM). Further, the non-volatile memory 20 is not necessarily a semiconductor memory, and the present embodiment is applicable to various storage media other than the semiconductor memory.

The memory system 1 may be a memory card or the like in which the memory controller 10 and the non-volatile memory 20 are configured as one package, or may be a solid state drive (SSD) or the like.

The memory controller 10 controls writing to the non-volatile memory 20 according to a write request from the host 30. Further, the memory controller 10 controls reading from the non-volatile memory 20 according to a read request from the host 30. The memory controller 10 includes a host I/F (host interface) 15, a memory I/F (memory interface) 13, a control unit 11, an encoding/decoding unit (codec) 14, and a data buffer 12. The host I/F 15, the memory I/F 13, the control unit 11, the encoding/decoding unit 14, and the data buffer 12 are connected to each other by an internal bus 16.

The host I/F 15 performs processing according to the interface standard with the host 30, and outputs a command received from the host 30, user data to be written, and the like to the internal bus 16. Further, the host I/F 15 transmits the user data read from the non-volatile memory 20 and restored, a response from the control unit 11, and the like to the host 30.

The memory I/F 13 performs a write operation to the non-volatile memory 20 based on an instruction of the control unit 11. Further, the memory I/F 13 performs a read operation from the non-volatile memory 20 based on an instruction of the control unit 11.

The control unit 11 comprehensively controls each component of the memory system 1. When the control unit 11 receives a command from the host 30 via the host I/F 15, the control unit 11 performs control according to the command. For example, the control unit 11 instructs the memory I/F 13 to write the user data and the parity to the non-volatile memory 20 according to the command from the host 30. Further, the control unit 11 instructs the memory I/F 13 to read the user data and the parity from the non-volatile memory 20 according to the command from the host 30.

When the control unit 11 receives a user data write request from the host 30, the control unit 11 stores the user data in the data buffer 12 and determines a storage area (memory area) of the user data in the non-volatile memory 20. That is, the control unit 11 manages the write destination of the user data. The correspondence between the logical address of the user data received from the host 30 and the physical address indicating the storage area on the non-volatile memory 20 in which the user data is stored is stored as an address conversion table.

When the control unit 11 receives a read request from the host 30, the control unit 11 converts the logical address specified by the read request into a physical address by using the above-mentioned address conversion table, and instructs the memory I/F 13 to read from the physical address.

In the NAND memory, writing and reading are generally performed in data units called pages, and erasing is performed in data units called blocks. In the present embodiment, a plurality of memory cells connected to the same word line are referred to as memory cell groups. When the memory cell is a single-level cell (SLC), one memory cell group corresponds to one page. When the memory cell is a multi-level cell (MLC), one memory cell group corresponds to a plurality of pages. In addition, each memory cell is connected to a word line and also to a bit line. Therefore, each memory cell can be identified by an address that identifies a word line and an address that identifies a bit line.

The data buffer 12 temporarily stores the user data received from the host 30 by the memory controller 10 until the user data is stored in the non-volatile memory 20. Further, the data buffer 12 temporarily stores the user data read from the non-volatile memory 20 until the user data is transmitted to the host 30. For the data buffer 12, for example, a general-purpose memory such as static random access memory (SRAM) or dynamic random access memory (DRAM) may be used.

The user data transmitted from the host 30 is transferred to the internal bus 16 and temporarily stored in the data buffer 12. The encoding/decoding unit 14 encodes the user data to generate a codeword. Further, the encoding/decoding unit 14 decodes the received word read from the non-volatile memory 20 and restores the user data. Therefore, the encoding/decoding unit 14 includes an encoder 17 and a decoder 18. The data coded by the encoding/decoding unit 14 may include control data or the like used in the memory controller 10 in addition to the user data.

Next, the write operation of the present embodiment will be described. The control unit 11 instructs the encoder 17 to encode the user data when writing the user data to the non-volatile memory 20. At that time, the control unit 11 determines a storage location (storage address) of the codeword in the non-volatile memory 20, and also instructs the memory I/F 13 of the determined storage location.

The encoder 17 encodes the user data on the data buffer 12 to generate a codeword based on the instruction from the control unit 11. As the encoding method, for example, an encoding method using a Bose-Chandhuri-Hocquenghem (BCH) code or a Reed-Solomon (RS) code may be adopted. The codeword generated by the encoder 17 is a multidimensional error-correction code such as the product code 500 illustrated with reference to FIG. 2 above. As described above, in the product code 500 illustrated in FIG. 2, the information bits (may be a symbol) $d_0$ to $d_3$, which are constituent units, have a structure protected by component codes 511 to 515 and 521 to 525, which are Hamming codes having an information length of 2 bits and a parity length of 3 bits, respectively, in the row direction (horizontal direction in the drawing) and the column direction (vertical direction in the drawing). In such the product code 500, all the information bits $d_0$ to $d_3$ and the parity bits $p_0$ to $p_{20}$ are doubly protected by the component codes (Hamming codes) 511 to 515 in the row direction and the component codes (Hamming codes) 521 to 525 in the column direction. The memory I/F 13 controls to store codewords in a storage location on the non-volatile memory 20 instructed by the control unit 11.

Next, processing at the time of reading from the non-volatile memory 20 of at least one embodiment will be described. When reading from the non-volatile memory 20, the control unit 11 specifies an address on the non-volatile memory 20 and instructs the memory I/F 13 to read. Further, the control unit 11 instructs the decoder 18 to start decoding. The memory I/F 13 reads a received word from the specified address of the non-volatile memory 20 according to the instruction of the control unit 11, and inputs the read received word to the decoder 18. The decoder 18 decodes the received word read from the non-volatile memory 20.

Figure 6:
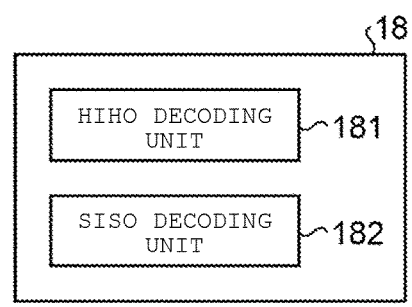
FIG. 6 is a block diagram of a decoder according to at least one embodiment.

The decoder 18 decodes the received word read from the non-volatile memory 20. FIG. 6 is a block diagram showing a schematic configuration example of the decoder 18. The decoder 18 includes a hard-input hard-output (HIHO) decoding unit 181 that executes decoding with a hard determination value as input and outputs the hard determination value as a result, and a soft-input soft-output (SISO) decoding unit 182 that executes decoding with a soft determination value as input and outputs the soft determination value as a result.

In general, SISO decoding has a feature of higher error-correction capability than HIHO decoding but longer processing time. Therefore, in the present embodiment, first, the HIHO decoding unit 181 is configured to HIHO decode the received word read from the non-volatile memory 20 as a hard determination value and read the received word that cannot be decoded by the hard determination decoding as a soft determination value. Then, an SISO decoding unit 182 is configured to perform SISO decoding of the received word read as a soft determination value. However, the present embodiment is not limited to such a configuration, and various modifications may be made such as a configuration in which HIHO decoding is omitted and SISO decoding is executed for all received words.

Figure 7:
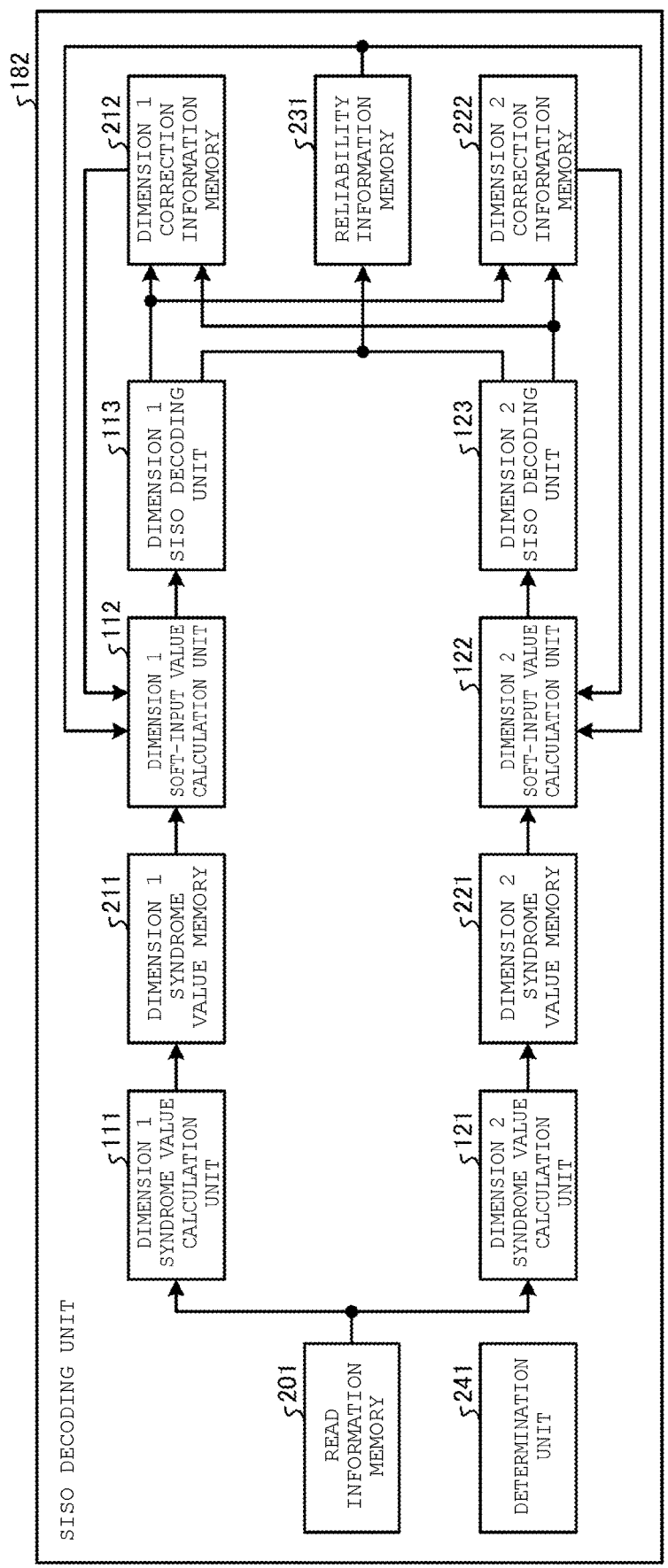
FIG. 7 is a block diagram of a SISO decoding unit according to a first embodiment.

Next, a more detailed configuration of the SISO decoding unit 182 shown in FIG. 6 will be described in detail with reference to drawings. FIG. 7 is a block diagram showing a schematic configuration example of the SISO decoding unit 182.

In at least one embodiment, a case where the data stored in the non-volatile memory 20 is data coded by a two-dimensional error-correction code will be described as an example. The data stored in the non-volatile memory 20 may be data coded by a multidimensional error-correction code other than two-dimensional error-correction code.

As shown in FIG. 7, the SISO decoding unit 182 includes a read information memory 201, a dimension 1 syndrome value calculation unit 111, a dimension 1 syndrome value memory 211, a dimension 1 soft-input value calculation unit 112, a dimension 1 SISO decoding unit 113, a dimension 1 correction information memory 212, a dimension 2 syndrome value calculation unit 121, a dimension 2 syndrome value memory 221, a dimension 2 soft-input value calculation unit 122, a dimension 2 SISO decoding unit 123, a dimension 2 correction information memory 222, a reliability information memory 231, and a determination unit 241.

The read information memory 201 stores the read information read from the non-volatile memory 20 by soft determination. In the read information, the data corresponding to a hard determination value, which is binary information that determines whether each bit is 0 or 1, may be referred to as hard bit data. Further, the data corresponding to the portion of the read information excluding the hard bit data may be referred to as soft bit data. The read information memory 201 may include a hard bit memory (HMEM) for storing hard bit data and a soft bit memory (CMEM) for storing soft bit data.

The number of pieces of soft bit data (X) may be set in any way, but an example of using one piece of soft bit data SB1 (X=1) will be mainly described below. The CMEM may further store not only soft bit data but also hard bit data. The value of the hard bit data stored in the HMEM may be updated during the decoding processing. When the CMEM stores not only the soft bit data but also the hard bit data, the value of the hard bit data stored in the CMEM is not updated during the decoding processing. That is, the hard bit data stored in the CMEM is read only.

Decoding processing (for example, calculation of soft-input value) may require data called a channel value. The channel value indicates the value of the log-likelihood ratio (LLR) corresponding to the set of hard bit data and soft bit data. The channel value may be referred to as a channel value LLR. The channel value is determined, for example, by an LLR table in which a set of hard bit data and soft bit data and a channel value are associated with each other.

In at least one embodiment where the symbol is an element in a binary field, the LLR indicates probability information about whether a bit is 0 or 1. In the following, LLR is assumed to be positive when the probability that the bit is 0 is high, and negative when the probability that the bit is 1 is high. Further, in the present embodiment, the calculated soft-input value is also expressed by LLR.

LLR can be expressed by reducing a value to binary information of 0 or 1 depending on whether the value is positive or negative. In the following, such binary information may be referred to as a hard determination value of LLR. Further, in the following, when LLR is positive, the hard determination value is set to 0, when LLR is negative, the hard determination value is set to 1, and when LLR is 0, the hard determination value is determined according to a predetermined rule (for example, the hard determination value is set to 0).

The "hard determination value of a channel value" corresponds to the information in which the channel value represented by LLR is represented by a binary value according to a positive value or a negative value as described above. Similarly, the "hard determination value of a soft-input value" corresponds to the information in which the soft-input value represented by LLR is represented by a binary value according to a positive value or a negative value as described above.

As described above, the value of the hard bit data stored in the HMEM may be updated during the decoding processing. Meanwhile, the channel value means a value corresponding to the hard bit data (hard bit data before update) immediately after being set in the HMEM. For example, in a configuration in which the HMEM data is updated during the decoding processing, if hard bit data is stored in the CMEM (and not updated during the decoding processing), the code of the channel value may be obtained during the decoding processing. The code of the channel value is referred to, for example, when modifying a syndrome value, as will be described later. The code of the channel value corresponds to whether the value of the hard bit data is 0 or 1.

When an absolute value of the channel value is required, for example, two values are used depending on whether the corresponding bit is a low-reliability bit. The low-reliability bit means a bit determined to have low reliability. For example, if a bit is a low-reliability bit, $L_L$ is used, and if the bit is not a low-reliability bit, $L_H$ is used as the absolute value of the channel value. The method for determining whether or not the bit is a low-reliability bit will be described later.

In the present embodiment, the non-volatile memory 20 stores data coded by a two-dimensional error-correction code. The hard bit data stored in the read information memory 201 may be data in which a part of the data coded by a two-dimensional error-correction code is changed to another value due to an error generated on the non-volatile memory 20. The read information memory 201 outputs hard bit data to the dimension 1 syndrome value calculation unit 111 and the dimension 2 syndrome value calculation unit 121.

The dimension 1 syndrome value calculation unit 111 calculates the syndrome value (dimension 1 syndrome value) of a dimension 1 component code (an example of a first component code). The syndrome value is a symbol string used by the error-correction code to calculate an error location, and is obtained, for example, by multiplying a parity check matrix of the error-correction code and the hard bit data. The dimension 1 syndrome value calculation unit 111 may obtain a syndrome value by a calculation simpler than a matrix operation by utilizing the structure of the error-correction code. The dimension 1 syndrome value obtained by the dimension 1 syndrome value calculation unit 111 is output to the dimension 1 syndrome value memory 211.

The dimension 1 syndrome value memory 211 stores the dimension 1 syndrome value calculated by the dimension 1 syndrome value calculation unit 111. The dimension 1 syndrome value memory 211 outputs the dimension 1 syndrome value to the dimension 1 soft-input value calculation unit 112.

The dimension 1 soft-input value calculation unit 112 calculates the dimension 1 soft-input value (an example of a first soft-input value) by using the dimension 1 syndrome value input from the dimension 1 syndrome value memory 211, the correction information input from the dimension 1 correction information memory 212, and the reliability information input from the reliability information memory 231. The details of a calculation method of the dimension 1 soft-input value by the dimension 1 soft-input value calculation unit 112 will be described later. The dimension 1 soft-input value calculation unit 112 outputs the dimension 1 soft-input value to the dimension 1 SISO decoding unit 113.

The dimension 1 correction information memory 212 is a memory for storing correction information (dimension 1 correction information, an example of first correction information) of the component code of the dimension 1. Similarly, the dimension 2 correction information memory 222 is a memory for storing correction information (dimension 2 correction information, an example of second correction information) of a dimension 2 component code (an example of a second component code).

The correction information includes information indicating the location (corrected location) corrected by the decoding processing and information indicating the difference between the values. The corrected location indicates, for example, a location where the value is different between the decoded word found by the decoding processing and the read data (hard bit data). When the symbol is an element in a binary field, the information indicating the difference between the values may be omitted. In the case of a binary field, "values being different" is limited to "bits being inverted". In the case of a binary field, the corrected location can also be interpreted as the location where the bit is corrected (corrected bit location).

In the present embodiment where the symbol is an element in a binary field, the dimension 1 correction information indicates a location where the value is different between the MAP decoded word found in the dimension 1 decoding processing and the dimension 2 decoding processing for the dimension 1 component code and the hard bit data stored in the read information memory 201. Similarly, the dimension 2 correction information indicates a location where the value is different between the MAP decoded word found in the dimension 1 decoding processing and the dimension 2 decoding processing for the dimension 2 component code and the hard bit data stored in the read information memory 201.

The method of setting the address (dimension 1 address) used by the dimension 1 correction information to indicate the location and the method of setting the address (dimension 2 address) used by the dimension 2 correction information to indicate the location may be different. For example, the dimension 1 address may be set so that the dimension 1 soft-input value calculation unit 112 can read the dimension 1 correction information at a higher speed. Similarly, the dimension 2 address may be set so that the dimension 2 soft-input value calculation unit 122 can read the dimension 2 correction information at a higher speed. An address in which the dimension 1 address and the dimension 2 address are shared may be used. In this case, one correction information memory in which the dimension 1 correction information memory 212 and the dimension 2 correction information memory 222 are shared may be used.

The size of the dimension 1 correction information stored in the dimension 1 correction information memory 212 may be set in any way. In the present embodiment, the size of dimension 1 correction information is set to a fixed value (for example, 15 bits). The number of pieces of the dimension 1 correction information (number of pieces of correction information) for each component code is determined by the determination unit 241 according to the number of component codes and the like. Details of the function of the determination unit 241 such as a method of determining the number of pieces of correction information will be described later.

The correction information for each dimension may further include an error flag and another dimension error flag. The error flag is information indicating whether or not the bit corresponding to the correction information is determined to be an error in the dimension corresponding to the correction information. The other dimension error flag is information indicating whether or not the bit corresponding to the correction information is determined to be an error in a dimension other than the dimension corresponding to the correction information (the other dimension).

For example, the dimension 1 correction information may include an error flag indicating whether or not an error is determined in the dimension 1 and another dimension error flag indicating whether or not an error is determined in the dimension 2.

As will be described later, the dimension 1 syndrome value memory 211 may store a syndrome value modified so as to correspond to the "syndrome value calculated from the hard determination value of the soft-input value". For such a configuration, the correction information may further include an inversion flag. The inversion flag is information indicating whether or not the code of the soft-input value is inverted in the dimension corresponding to the correction information. Whether or not the code of the soft-input value is inverted may be rephrased as whether or not the code of the soft-input value is opposite to the code of the channel value.

The reliability information memory 231 is a memory for storing reliability information. The reliability information is information indicating the certainty (decoding reliability) of SISO decoding of each component code. The reliability information memory 231 stores reliability information for each component code. For example, the reliability information memory 231 stores reliability information of the component code of the dimension 1 (an example of first reliability information) and reliability information of the component code of the dimension 2 (an example of second reliability information).

The reliability information is, for example, a metric calculated from a soft-input value (=probability information) and indicating whether a codeword c has a high or low probability of being the original component codeword. For example, as the reliability information in a binary code, the likelihood calculated from the soft-input value S for the codeword c may be used. The reliability information is not limited thereto, and for example, the following information may be used.

(I1) Probability value with correct codeword c
(I2) Value of a distance function between the codeword c and the soft-input value S
(I3) A value obtained by applying a logarithmic function or the like to the value shown in (I1) or (I2) above.

The dimension 1 SISO decoding unit 113 performs SISO decoding using the dimension 1 soft-input value input from the dimension 1 soft-input value calculation unit 112, and obtains correction information (corrected bit location) and reliability information of the SISO decoding. The dimension 1 SISO decoding unit 113 outputs the correction information (corrected bit location) to the dimension 1 correction information memory 212 and the dimension 2 correction information memory 222, and outputs the reliability information to the reliability information memory 231.

The dimension 1 SISO decoding unit 113 represents the correction information (corrected bit location) to be output to the dimension 1 correction information memory 212 and the dimension 2 correction information memory 222 by the addresses (dimension 1 address or dimension 2 address) used in the respective memories, and outputs the correction information to the corresponding memory among the dimension 1 correction information memory 212 and the dimension 2 correction information memory 222.

As described above, the processing for the dimension 1 component code is realized by using the dimension 1 syndrome value calculation unit 111, the dimension 1 syndrome value memory 211, the dimension 1 soft-input value calculation unit 112, the dimension 1 SISO decoding unit 113, the dimension 1 correction information memory 212, the reliability information memory 231, and the dimension 2 correction information memory 222.

If the "dimension 1" and the "dimension 2" are interchanged, the processing for the dimension 2 component code is equivalent to the processing for the dimension 1 component code, and therefore detailed description thereof will be omitted. For example, each part used in the processing for the dimension 1 component code corresponds to each part used in the processing for the dimension 2 component code as follows.

Dimension 1 syndrome value calculation unit 111: dimension 2 syndrome value calculation unit 121

Dimension 1 syndrome value memory 211: dimension 2 syndrome value memory 221

Dimension 1 soft-input value calculation unit 112: dimension 2 soft-input value calculation unit 122

Dimension 1 SISO decoding unit 113: dimension 2 SISO decoding unit 123

Dimension 1 correction information memory 212: dimension 2 correction information memory 222

The reliability information memory 231 is commonly used in the processing for the component code of the dimension 1 and the processing for the component code of the dimension 2.

In the following, when the dimensions are not distinguished, each memory may be expressed as follows.

Dimension 1 syndrome value memory 211, dimension 2 syndrome value memory 221: SMEM Dimension 1 correction information memory 212, dimension 2 correction information memory 222: FMEM Next, the details of the function of the determination unit 241 will be described. The determination unit 241 determines the number of pieces of correction information, which is the number of pieces of correction information (dimension 1 correction information and dimension 2 correction information) stored in FMEM for each of the M component codes. The determination unit 241 allocates a memory area of FMEM for storing the correction information for the number of pieces of correction information for each of the M component codes. Further, the determination unit 241 determines the address (correction information address) on FMEM of the correction information for each of the M component codes based on the number of pieces of correction information.

As a method of determining the number of pieces of correction information per component code, there is a method of setting the number of pieces of correction information to a fixed value. However, in such a method, the memory area of FMEM may not be used efficiently.

For example, the memory system 1 may be configured to change the number of parity bits according to a change in a bit error rate over time by a variable length code as an error-correction code. An increase in the number of parity bits corresponds to an increase in the number of component codes (hereinafter, referred to as the number of component codes) in a product code, for example. The total capacity of the memory area of FMEM is determined as follows, for example.

(Maximum number of component codes)×(Number of pieces of correction information: fixed value)×(Size of correction information: fixed value)

The maximum number of component codes indicates, for example, the maximum value that the number of component codes can take when the number of parity bits is variable. When the maximum number of component codes is 500, the number of pieces of correction information is 10, and the size of the correction information is 15 bits, the total capacity of the memory area of FMEM is about 9.4 kilobytes.

It can be said that a method for determining the total capacity as described above is a method for determining the total capacity so that the memory area for storing the correction information does not become insufficient even when the number of component codes becomes maximum. However, when the number of component codes is small, an unused memory area may be generated in the total capacity. For example, the total capacity of FMEM is calculated with the maximum number of component codes as 500, but when the number of component codes is set to 100, 80% of the memory area is unused. As described above, in the method in which the number of pieces of correction information is set to a fixed value, the memory area of FMEM may not be used efficiently.

Therefore, the determination unit 241 determines the number of pieces of correction information to be assigned to one component code according to a value based on the number of component codes. In the present embodiment, the determination unit 241 determines the number of pieces of correction information by using the number of component codes M (hereinafter, also referred to as the number of component codes) as the value based on the number of component codes.

Hereinafter, a case where the number of component codes M can be set in two stages of 100 (the number of component codes: small) and 500 (the number of component codes: large) will be described as an example. The setting of the number of component codes M is stored in, for example, a register and can be referred to by the determination unit 241.

The determination unit 241 determines the number of pieces of correction information so that the larger the value of M, the smaller the value. For example, the determination unit 241 sets the number of pieces of correction information to 5 when the number of component codes M is 500, and sets the number of pieces of correction information to 10 when the number of component codes M is 100.

Assuming that the size of the correction information is a fixed value of 15 bits, when the number of component codes M is 500, a memory area of about 4.7 kilobytes 500×5×15 bits) is required. When the number of component codes M is 100, a memory area of about 1.9 kilobytes 100×10×15 bits) is required. Therefore, compared with the above example (about 9.4 kilobytes) in which the number of pieces of correction information is fixed to 12, the total capacity of the memory area required for FMEM can be reduced by half.

For example, if the latency limit value of decoding is increased, the time required for decoding increases, and the number of corrected locations found may increase. When more corrected locations than the number of pieces of correction information are found for one component code, the correction information cannot be stored for all the corrected locations, and the decoding may fail. If the number of pieces of correction information is appropriately set according to the latency limit value or the like, it is possible to reduce the rate of decoding failure. In the present embodiment, when the number of component codes M is 100, the number of pieces of correction information is 12, which is the same as the example in which the number of pieces of correction information is a fixed value. Therefore, there is no deterioration in decoding performance as compared with this example.

In the description so far, the number of pieces of correction information when the number of component codes is large (for example, 500) is half the number of pieces of correction information when the number of component codes is small (for example, 100). The method for determining the number of pieces of correction information is not limited thereto, and any method may be used as long as the method is a method for determining the number of pieces of correction information so that the larger the value of the number of component codes M, the smaller the value.

Figure 8:
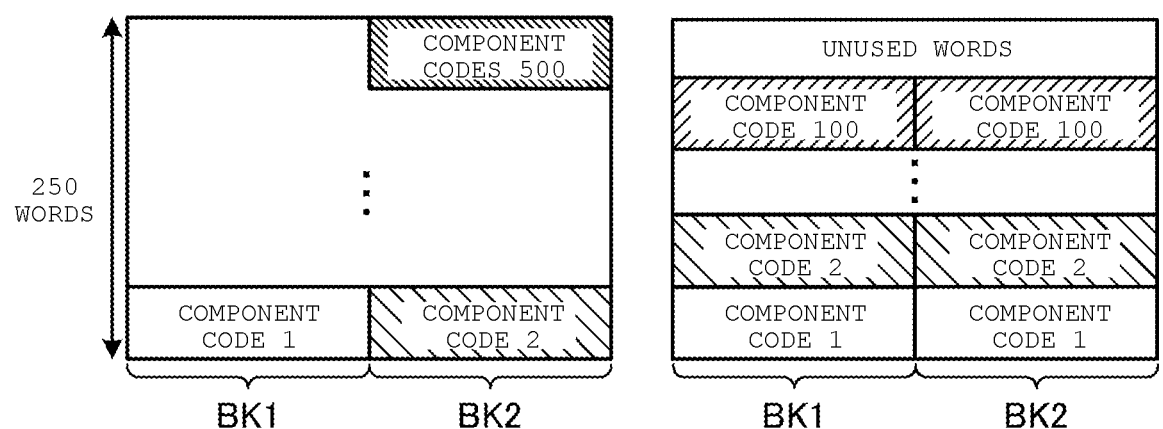
FIG. 8 is a diagram illustrating an example of allocating a memory area of a correction information memory.

FIG. 8 is a diagram illustrating an example of allocating the memory area of FMEM. The "component code y" in the drawing represents a y-th component code among the M component codes. In the example of FIG. 8, FMEM is composed of two banks BK1 and BK2. One rectangle represents a memory area allocated for one component code.

As shown in the left part of FIG. 8, when the number of component codes M is 500, one of the two banks BK1 and BK2 is assigned to one component code. Assuming that the unit of data accessed in one cycle is a word, in the example of FIG. 8, a memory area for 250 words is required. As shown in the right part of FIG. 8, when the number of component codes M is 100, the two banks BK1 and BK2 are assigned to one component code.

An example of calculating a correction information address when the memory area as shown in FIG. 8 is allocated will be described. For example, the determination unit 241 can calculate the address of the y-th component code by an address conversion method that differs depending on the number of component codes as follows.

When the number of component codes M is 100 (the number of component codes: small): the correction information address of the y-th component code is 2(y−1)+1 to 2y The number of component codes M is 500 (number of component codes: large): the correction information address of the y-th component code is y The above FMEM configuration and address conversion method are examples, and the present disclosure is not limited thereto. For example, FMEM may be composed of one bank or three or more banks. The address conversion method may be any method as long as the correction information address of the y-th component code can be calculated according to the number of banks and the number of pieces of correction information determined for the number of component codes, respectively.

Figure 9:
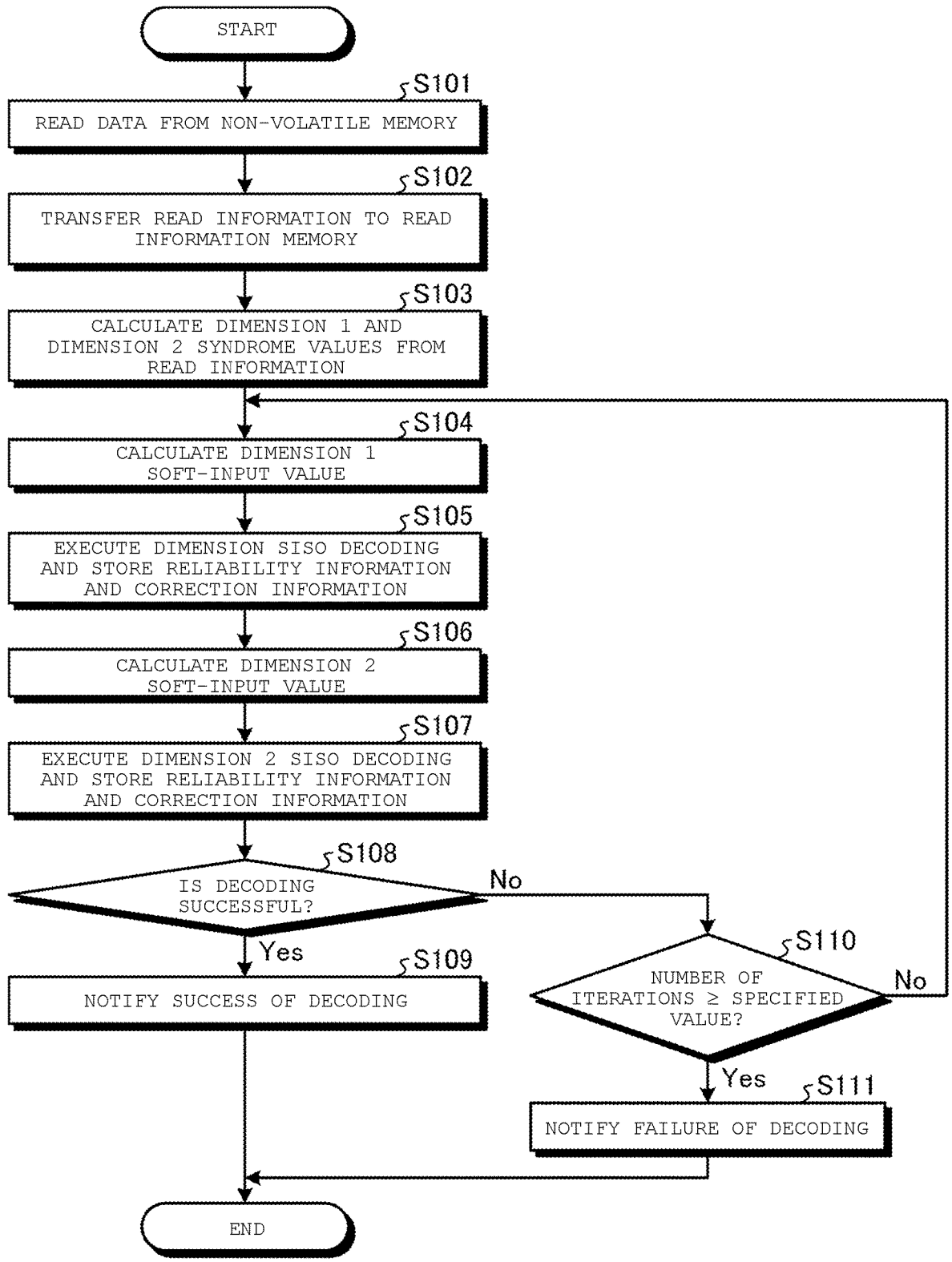
FIG. 9 is a flowchart of decoding processing by the memory system of the first embodiment.

FIG. 9 is a flowchart showing an example of the decoding processing by the memory system of the present embodiment. FIG. 9 shows an example of decoding processing for a two-dimensional error-correction code.

The control unit 11 reads the error-correction code from the non-volatile memory 20 and obtains the read information (step S101). The control unit 11 transfers the read information to the read information memory 201 and stores the information (step S102).

The dimension 1 syndrome value calculation unit 111 and the dimension 2 syndrome value calculation unit 121 calculate the dimension 1 syndrome value and the dimension 2 syndrome value from the read information (hard bit data), respectively (step S103). For example, the dimension 1 syndrome value calculation unit 111 reads the hard bit data stored in the read information memory 201, calculates the dimension 1 syndrome value by using the read hard bit data, and stores the same in the dimension 1 syndrome value memory 211. The dimension 2 syndrome value calculation unit 121 reads the hard bit data stored in the read information memory 201, calculates the dimension 2 syndrome value by using the read hard bit data, and stores the same in the dimension 2 syndrome value memory 221.

Next, the decoding processing of the dimension 1 component code is executed. The following steps S104 and S105 are executed for each of the plurality of dimension 1 component codes.

First, the dimension 1 soft-input value calculation unit 112 calculates a dimension 1 soft-input value by using the calculated dimension 1 syndrome value, the correction information input from the dimension 1 correction information memory 212, and the reliability information input from the reliability information memory 231 (step S104). The dimension 1 soft-input value calculation unit 112 can read the correction information from the dimension 1 correction information memory 212 by using the correction information address calculated by the determination unit 241 as described above.

An example of a calculation method of a soft-input value will be described below. In the following, an example of the calculation method of the soft-input value (dimension 1 soft-input value) for a dimension 1 component code will be described, but the same procedure is applicable to the calculation of the soft-input value (dimension 2 soft-input value) for a dimension 2 component code (step S106).

The dimension 1 soft-input value calculation unit 112 reads a dimension 1 syndrome value s from the dimension 1 syndrome value memory 211, and substitutes the dimension 1 syndrome value s into a variable x.

The dimension 1 soft-input value calculation unit 112 reads the correction information from the dimension 1 correction information memory 212. Among the read correction information, correction information found in the other dimension (dimension 2) is defined as $a_1, a_2, \ldots, a_m$. The values of $a_1, a_2, \ldots, a_m$ indicate the bit locations in the dimension 1 component code. That is, the correction information indicates that the bits are inverted at each location indicated by the correction information.

The dimension 1 soft-input value calculation unit 112 reads reliability information $pr_1, pr_2, \ldots, pr_m$ corresponding to $a_1, a_2, \ldots, a_m$ from the reliability information memory 231.

The dimension 1 soft-input value calculation unit 112 calculates the following for a location $a_i$ (i=1, 2, . . . , m).
(C1) Obtain an external value $e_i$ from $pr_i$.
(C2) Obtain $\sigma_i = \lambda_i + e_i$. If $\lambda_i \sigma_i < 0_i$, the variable x is rewritten to the value of $x + Hx_i$. $\lambda_i$ indicates the function of the read hard bit data. H indicates a parity check matrix of the dimension 1 component code. $x_i$ indicates a vector in which only the component corresponding to the location $a_i$ is 1, and the other components are 0.

The dimension 1 soft-input value calculation unit 112 sets the finally obtained value of the variable x (that is, the value obtained by rewriting the above-mentioned (C2) starting from the dimension 1 syndrome value s) as s'. The dimension 1 soft-input value calculation unit 112 outputs s', $\sigma_1$, $\sigma_2, \ldots, \sigma_m, a_1, a_2, \ldots, a_m$ as a soft-input value.

In the method described above, s' is obtained by updating the dimension 1 syndrome value s read from the dimension 1 syndrome value memory 211 by using the information $a_1$, $a_2, \ldots, a_m, pr_1, pr_2, \ldots, pr_m$ obtained when the dimension 1 syndrome value s is read. As a modification example of this method, s' may be obtained by updating the dimension 1 syndrome value s at the time point when $a_1, a_2, \ldots, a_m$, $pr_1, pr_2, \ldots, pr_m$ is obtained (step S105 as described below), and s' may be stored in the dimension 1 syndrome value memory 211. In this case, in step S104, it is not necessary to update the value s' read from the dimension 1 syndrome value memory 211.

Step S105 will be described. The dimension 1 SISO decoding unit 113 performs dimension 1 SISO decoding, stores correction information indicating the corrected bit location in the dimension 1 correction information memory 212 and the dimension 2 correction information memory 222, and stores the reliability information obtained as a result of SISO decoding in the reliability information memory 231 (step S105). The dimension 1 SISO decoding unit 113 can store the correction information in the dimension 1 correction information memory 212 by using the correction information address calculated by the determination unit 241 as described above.

An example of SISO decoding will be described below. The following example is an example of SISO decoding using the above-mentioned example of the soft-input value. Although an example of SISO decoding for the dimension 1 component code will be described below, the same procedure is applicable to the dimension 2 component code.

The dimension 1 SISO decoding unit 113 may be configured to execute any one of the SISO decoding described below, or may be configured to switch and execute a plurality of types of SISO decoding. For example, the dimension 1 SISO decoding unit 113 may execute the SISO decoding selected from the plurality of types of SISO decoding according to the decoding status.

Example of SISO Decoding 1: Limit Distance Decoding

The dimension 1 SISO decoding unit 113 obtains a corrected bit location and reliability information by decoding in the following procedure using s'.

(E1-1) s' is used to decode the limit distance of the dimension 1 component code and obtain a corrected bit location e (this decoding method is called syndrome decoding).

(E1-2) From the corrected bit location e and the reliability information stored in the reliability information memory 231, the reliability information pr of the decoding result of the dimension 1 component code is obtained.

(E1-3) The corrected bit location e and the reliability information pr are output.

Example of SISO Decoding 2: A Method Applying Chase Decoding

The dimension 1 SISO decoding unit 113 obtains a corrected bit location and reliability information by decoding the following procedure using s', $\sigma_1, \sigma_2, \ldots, \sigma_m, \ldots, a_1, a_2, \ldots, a_m$.

(E2-1) $\sigma_1, \sigma_2, \ldots, \sigma_m$ is sorted in ascending order of the absolute value. Also $a_1, a_2, \ldots, a_m$ are rearranged so that subscripts correspond to $\sigma_1, \sigma_2, \ldots, \sigma_m$. Sorting may be performed approximately. Hereafter, $\sigma_1, \sigma_2, \ldots, \sigma_m, a_1, a_2, \ldots, a_m$ are the values after sorting processing.

(E2-2) t and f ($t \leq m$ and $f \leq t$) are used as optional constants to select f pieces from $a_1, a_2, \ldots, a_t$. The following processing (E2-2-1) is performed for each combination of $_tC_f$ selections.

(E2-2-1) A syndrome value s'' with the bit at a selected location inverted is calculated from s' (the same calculation as in (C2) of step S104). Then, syndrome decoding is performed by using s'' to obtain a corrected bit location e. The reliability information pr of the dimension 1 component code is obtained from the corrected bit location e, f inverted locations, and the reliability information stored in the reliability information memory 231.

(E2-3) It is assumed that $(e\hat{}, pr\hat{})$ is the set with the maximum reliability information among the sets of corrected bit locations and reliability information obtained for each combination of selections in $_tC_f$.

(E2-4) The corrected bit location $e\hat{}$ and the reliability information $pr\hat{}$ are output.

Return to the description of the flowchart of FIG. 9. Next, the decoding processing of the component code of the dimension 2 is executed. The following steps S106 and S107 are executed for each of a plurality of dimension 2 component codes.

First, the dimension 2 soft-input value calculation unit 122 calculates a dimension 2 soft-input value (an example of a second soft-input value) by the calculated dimension 2 syndrome value, the correction information input from the dimension 2 correction information memory 222, and the reliability information input from the reliability information memory 231 (step S106). Step S106 can be executed by the same procedure as in step S104.

The dimension 2 soft-input value calculation unit 122 performs dimension 2 SISO decoding, stores correction information indicating the corrected bit location in the dimension 1 correction information memory 212 and the dimension 2 correction information memory 222, and stores the reliability information obtained as a result of SISO decoding in the reliability information memory 231 (step S107). Step S107 can be executed by the same procedure as in step S105.

Next, the decoder 18 determines whether or not the decoding is successful (step S108). Successful decoding may mean, for example, that a decoded word that can be determined to be correct is found.

Meanwhile, when the decoding is not successful (NO in step S108), the decoder 18 determines whether or not the number of iterations of the present operation reaches a preset specified value (step S110). When the specified value has not been reached (NO in step S110), the decoder 18 increments the number of iterations by 1, returns to step S104, and executes the subsequent operations. When the specified value is reached (YES in step S110), the decoder 18 notifies an external control unit or the like of the failure of the decoding (step S111), and ends the decoding processing. The number of iterations may be, for example, the number of times the operations of steps S104 to S107 are repeated.

When the decoding is successful (YES in step S108), the decoder 18 notifies the external control unit or the like of the decoded word with the success of the decoding (step S109), and ends the decoding processing. The decoder 18 modifies the hard bit data written in the read information memory 201 by using, for example, information stored in the reliability information memory 231, the dimension 1 correction information memory 212, and the dimension 2 correction information memory 222, which is obtained by the decoding processing. The decoder 18 uses the modified hard bit data as a final output (output decoded word).

For example, the decoder 18 calculates the logarithmic posterior probability ratio for each bit of the hard bit data in the read information memory 201 by using the above Equation (1). The decoder 18 determines whether to modify the hard bit data corresponding to each bit stored in the read information memory 201 based on the positive/negative of the calculated logarithmic posterior probability ratio. The decoder 18 modifies the hard bit data as determined and uses the modified data as an output decoded word.

In the example of FIG. 9, the hard bit data stored in the read information memory 201 is collectively corrected in step S109. The method for correcting the hard bit data is not limited thereto, and for example, a method for correcting the hard bit data each time immediately after each repeated SISO decoding may be used. In this case, the correction processing in step S109 is unnecessary, and the hard bit data stored in the read information memory 201 when the step S109 is reached may be used as the final output (output decoded word) as it is.

So far, an example of decoding processing with a two-dimensional error-correction code has been described, but as described above, the same procedure is applicable to a multidimensional (N-dimensional) error-correction code. For example, the a-th component code ($1 \leq a \leq ni$, ni is a component code in an i-th dimension) in the i-th dimension ($1 \leq i \leq N$) is defined as an a-th component code among N dimensions, and the correction information, reliability information, and soft-input value for the a-th component code are defined as a-th correction information, a-th reliability information, and an a-th soft-input value, respectively.

In this case, the decoder 18 calculates the a-th soft-input value for the i-th component code based on the a-th correction information, the a-th reliability information, and the syndrome value of the a-th component code. The decoder 18 calculates a decoded word of the a-th component code, a-th correction information, and a-th reliability information by inputting the a-th soft-input value and performing decoding processing of the a-th component code. The decoder 18 stores the calculated a-th correction information and b-th correction information indicating the corrected location of the b-th component code ($j \neq i$, $1 \leq j \leq N$, b is the index of the j-th dimension component code) corrected by decoding processing of the a-th component code in the correction information memory, and stores the a-th reliability information in the reliability information memory.

In the memory system of at least one embodiment, the number of pieces of correction information per component code is not fixed, but is determined according to the number of component codes M. For example, the number of pieces of correction information is determined so that the larger the number of component codes M, the smaller the value. As a result, the total capacity of the required memory can be reduced even when the number of component codes is large.

Second Embodiment

The memory for which the number of pieces of information to be stored is changed according to the number of component codes is not limited to the correction information memory (FMEM). In a second embodiment, an example will be described in which a memory (low-reliability location information memory) for storing low-reliability location information indicating the location of a bit determined to have low reliability (low-reliability bit) is targeted.

Figure 10:
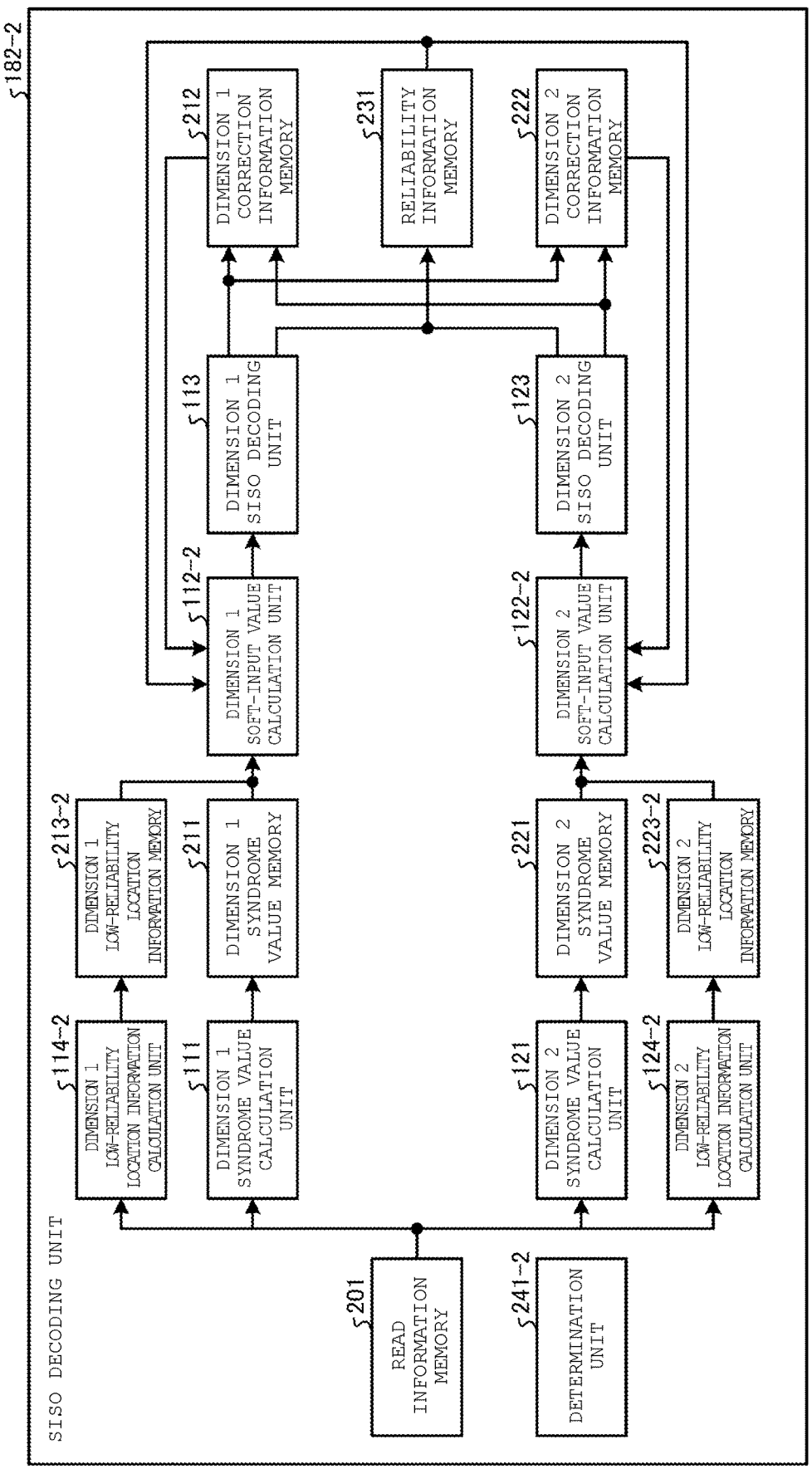
FIG. 10 is a block diagram of a SISO decoding unit according to a second embodiment.

In the memory system of the second embodiment, the function of the SISO decoding unit is different from that of the first embodiment. Hereinafter, the function of an SISO decoding unit 182-2 of the second embodiment will be described. FIG. 10 is a block diagram showing a schematic configuration example of the SISO decoding unit 182-2.

As shown in FIG. 10, the SISO decoding unit 182-2 includes a read information memory 201, a dimension 1 syndrome value calculation unit 111, a dimension 1 low-reliability location information calculation unit 114-2, a dimension 1 low-reliability location information memory 213-2, a dimension 1 syndrome value memory 211, a dimension 1 soft-input value calculation unit 112-2, a dimension 1 SISO decoding unit 113, a dimension 1 correction information memory 212, a dimension 2 syndrome value calculation unit 121, a dimension 2 syndrome value memory 221, a dimension 2 low-reliability location information calculation unit 124-2, a dimension 2 low-reliability location information memory 223-2, a dimension 2 soft-input value calculation unit 122-2, a dimension 2 SISO decoding unit 123, a dimension 2 correction information memory 222, a reliability information memory 231, and a determination unit 241-2. FIG. 10 shows an example in which the symbol of a code is two-dimensional, but as described above, the SISO decoding unit 182-2 may have a configuration corresponding to a multidimensional error-correction code other than a two-dimensional error-correction code.

In the second embodiment, the functions of the dimension 1 low-reliability location information calculation unit 114-2, the dimension 1 low-reliability location information memory 213-2, the dimension 1 soft-input value calculation unit 112-2, and the dimension 2 low-reliability location information calculation unit 124-2, the dimension 2 low-reliability location information memory 223-2, the dimension 2 soft-input value calculation unit 122-2, and the determination unit 241-2 are different from those of the first embodiment. Since other configurations are the same as those of the first embodiment, the same reference numerals are given and the description thereof will be omitted.

The dimension 1 low-reliability location information calculation unit 114-2 calculates the low-reliability location information (dimension 1 low-reliability location information, an example of first low-reliability location information) of the component code of the dimension 1. The low-reliability location information is information indicating the location of a bit (low-reliability bit) determined to have low reliability.

The dimension 1 low-reliability location information memory 213-2 stores the dimension 1 low-reliability location information calculated by the dimension 1 low-reliability location information calculation unit 114-2. The dimension 1 low-reliability location information memory 213-2 outputs the dimension 1 low-reliability location information to the dimension 1 soft-input value calculation unit 112-2.

Figure 11:
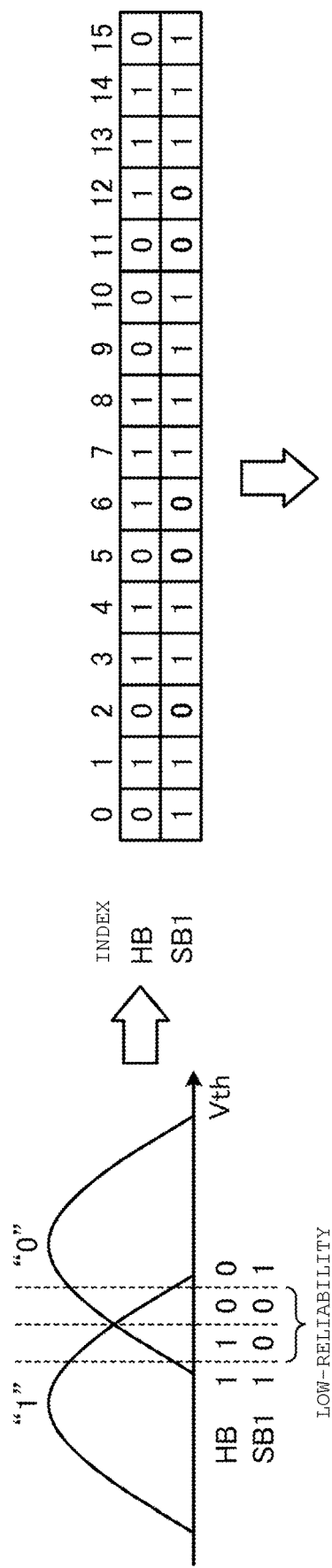
FIG. 11 is a diagram illustrating an example of calculation and storage of low-reliability location information.
Figure 11:
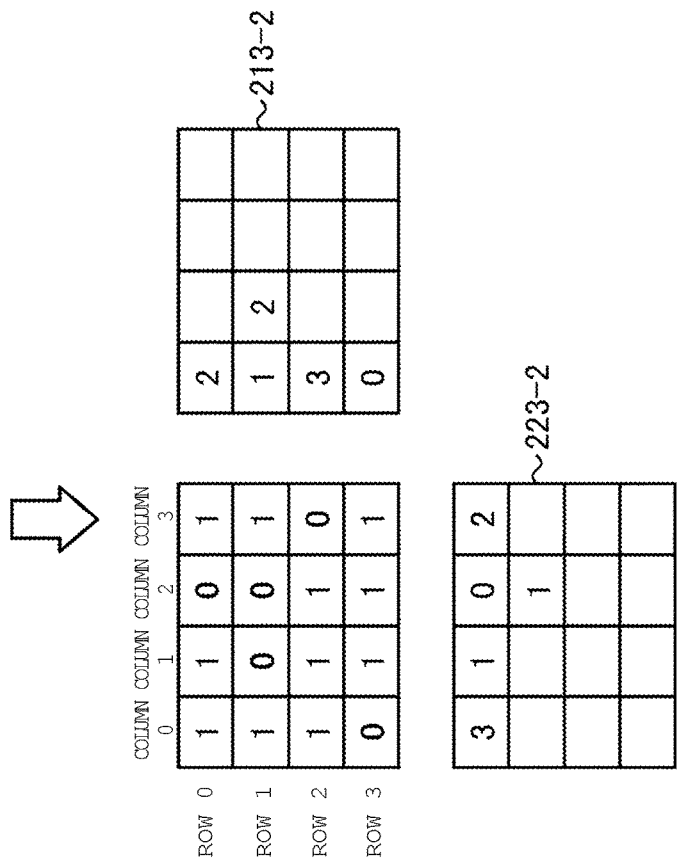

FIG. 11 is a diagram illustrating an example of calculation and storage of low-reliability location information. FIG. 11 describes an example of using a 4-by-4 product code having a code length (the number of component codes) of 16. The graph on the upper left of FIG. 11 shows the relationship between a threshold voltage distribution, hard bit data (HB), and soft bit data (SB1). In the example of FIG. 11, the value "0" of SB1 corresponding to the area where the distribution corresponding to the bit "1" and the distribution corresponding to the bit "0" overlap indicates that the reliability of this bit is low.

That is, the dimension 1 low-reliability location information calculation unit 114-2 determines that the corresponding bit is a low-reliability bit when the value of SB1 is "0", and determines that the corresponding bit is not a low-reliability bit when the value of SB1 is "1".

The table on the upper right of FIG. 11 shows an example of HB and SB1 values of each of the 16 bits. The index is information that identifies each of the 16 bits. For each index, 2-bit information of HB and SB1 is obtained.

The lower right diagram of FIG. 11 includes a diagram showing SB1 of the upper right table in the same 4-by-4 format as the product code. In the example of FIG. 11, the index value and the row correspond as follows.

Index 0 to 3: row 0
Index 4 to 7: row 1
Index 8 to 11: row 2
Index 12 to 15: row 3

The dimension 1 low-reliability location information indicates the location of the low-reliability bit in the dimension 1 (row direction). The dimension 1 low-reliability location information can also be interpreted as corresponding to an address (address in the component code) indicating the location of the low-reliability bit of each component code of the dimension 1.

For example, in a row 0, the bit corresponding to a column 2 is a low-reliability bit (value of SB1 is 0). Therefore, the dimension 1 low-reliability location information calculation unit 114-2 sets the dimension 1 low-reliability location information with respect to the row 0 as "2", which is an address in the component code indicating the location of the column 2. Similarly, the dimension 1 low-reliability location information calculation unit 114-2 calculates the dimension 1 low-reliability location information for rows 1 to 3. The calculated dimension 1 low-reliability location information is stored in the dimension 1 low-reliability location information memory 213-2 as shown in FIG. 11.

The dimension 1 low-reliability location information calculation unit 114-2 reads, for example, the soft bit data (SB1) stored in the CMEM, calculates the dimension 1 low-reliability location information by using the read SB1 value, and stores the calculated dimension 1 low-reliability location information in the dimension 1 low-reliability location information memory 213-2. This series of operations may be referred to as initialization of the dimension 1 low-reliability location information memory 213-2.

In the example of FIG. 11, the dimension 1 low-reliability location information memory 213-2 can store a total of 16 pieces of the four-component code, with the dimension 1 low-reliability location information as four pieces for each component code. Assuming that the number of pieces of dimension 1 low-reliability location information is a fixed value, as in the first embodiment, the memory area of the low-reliability location information memory (dimension 1 low-reliability location information memory 213-2 and dimension 2 low-reliability location information memory 223-2) may not be efficiently used.

Therefore, the determination unit 241-2 determines the number of pieces of low-reliability location information to be assigned to one component code according to the value based on the number of component codes. The determination unit 241-2 determines the number of pieces of low-reliability location information by using the number of component codes M as a value based on the number of component codes. The determination unit 241-2 allocates a memory area of the low-reliability location information memory for storing the low-reliability location information corresponding to the number of pieces of low-reliability location information for each of the M component codes. The determination unit 241-2 determines an address (low-reliability location information address) on the low-reliability location information memory of the low-reliability location information for each of the M component codes based on the number of pieces of low-reliability location information.

The method for determining the number of pieces of low-reliability location information is the same as the method for determining the number of pieces of correction information by the determination unit 241 of the first embodiment. That is, the determination unit 241-2 determines the number of pieces of low-reliability location information so that the larger the value of M, the smaller the value. For example, the determination unit 241-2 sets the number of pieces of low-reliability location information to 15 when the number of component codes M is 500, and sets the number of pieces of low-reliability location information to 30 when the number of component codes M is 100.

The determination unit 241-2 may further have the same function as the determination unit 241 of the first embodiment. That is, the determination unit 241-2 may be configured to have both a function of determining the number of pieces of correction information and a function of determining the number of pieces of low-reliability location information.

When it is necessary to determine whether or not the bit in the decoding processing is a low-reliability bit, the following two methods (A1) and (A2) may be used. In the present embodiment, the method of using the dimension 1 low-reliability location information memory 213-2 as in (A1) is mainly applied.

(A1) If the dimension 1 low-reliability location information memory 213-2 is accessed and the dimension 1 low-reliability location information (address in the component code) indicating the location of the corresponding bit exists, it is determined that the corresponding bit is a low-reliability bit, and if the dimension 1 low-reliability location information does not exist, it is determined that the corresponding bit is a high-reliability bit.

(A2) If the CMEM is accessed and SB1 of the corresponding bit is 0, it is determined that the corresponding bit is a low-reliability bit, and if SB1 is 1, it is determined that the corresponding bit is a high-reliability bit.

The dimension 1 soft-input value calculation unit 112-2 calculates the dimension 1 soft-input value (an example of the first soft-input value) by using a dimension 1 syndrome value input from the dimension 1 syndrome value memory 211, correction information input from the dimension 1 correction information memory 212, reliability information input from the reliability information memory 231, and the dimension 1 low-reliability location information input from the dimension 1 low-reliability location information memory 213-2. The details of the calculation method of the dimension 1 soft-input value by the dimension 1 soft-input value calculation unit 112-2 will be described later. The dimension 1 soft-input value calculation unit 112-2 outputs the dimension 1 soft-input value to the dimension 1 SISO decoding unit 113.

The processing for the component code of the dimension 1 is realized by using the dimension 1 syndrome value calculation unit 111, the dimension 1 syndrome value memory 211, the dimension 1 low-reliability location information calculation unit 114-2, the dimension 1 low-reliability location information memory 213-2, the dimension 1 soft-input value calculation unit 112-2, the dimension 1 SISO decoding unit 113, the dimension 1 correction information memory 212, the reliability information memory 231, and the dimension 2 correction information memory 222.

If the "dimension 1" and the "dimension 2" are interchanged, the processing for the dimension 2 component code is equivalent to the processing for the dimension 1 component code, and therefore detailed description thereof will be omitted. For example, each part used in the processing for the dimension 1 component code corresponds to each part used in the processing for the dimension 2 component code as follows.

Dimension 1 syndrome value calculation unit 111: dimension 2 syndrome value calculation unit 121

Dimension 1 syndrome value memory 211: dimension 2 syndrome value memory 221

Dimension 1 low-reliability location information calculation unit 114-2: dimension 2 low-reliability location information calculation unit 124-2

Dimension 1 low-reliability location information memory 213-2: dimension 2 low-reliability location information memory 223-2

Dimension 1 soft-input value calculation unit 112-2: dimension 2 soft-input value calculation unit 122-2

Dimension 1 SISO decoding unit 113: dimension 2 SISO decoding unit 123

Dimension 1 correction information memory 212: dimension 2 correction information memory 222

In the following, when the dimensions are not distinguished, each memory may be expressed as follows.

Figure 12:
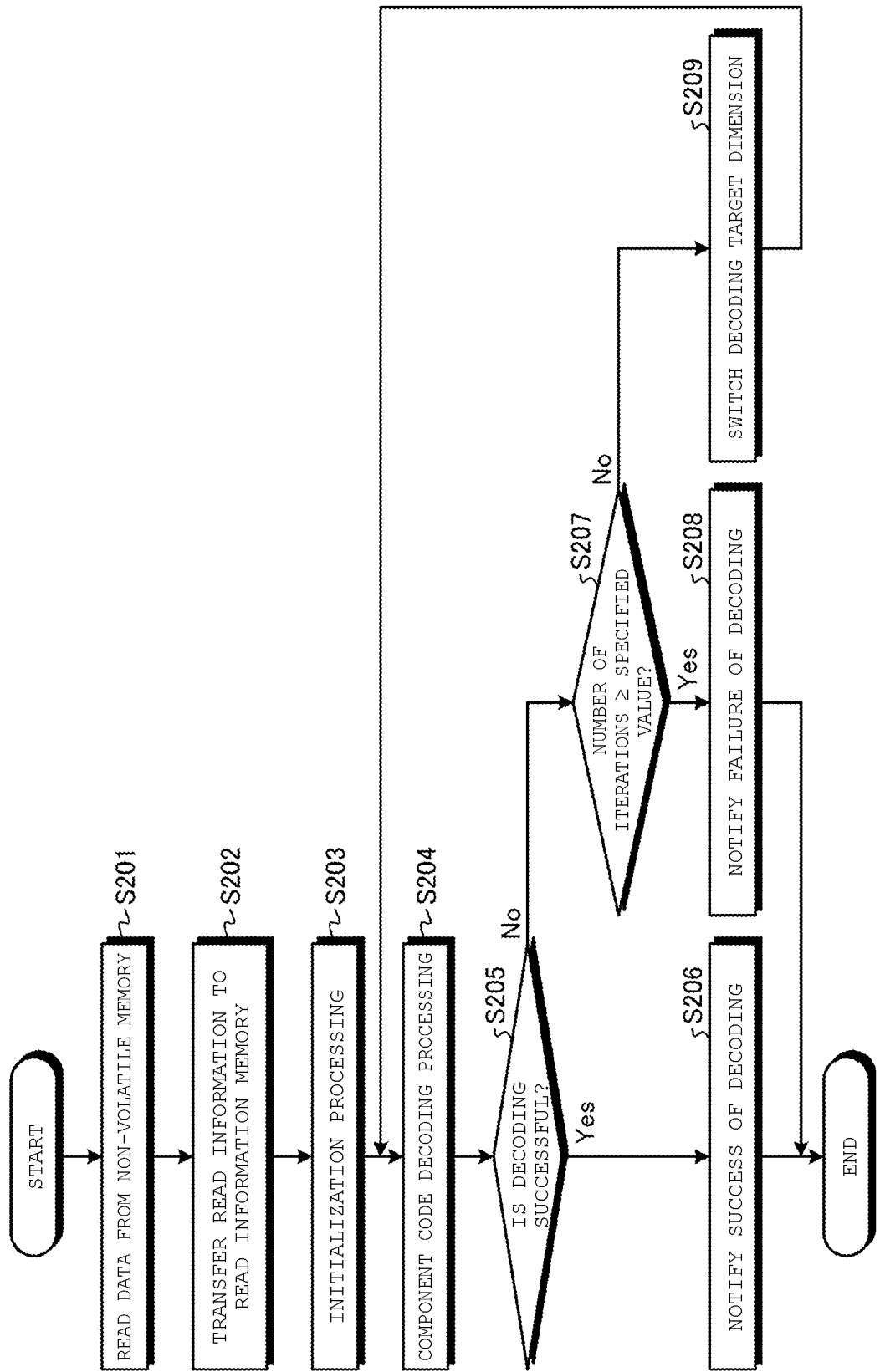
FIG. 12 is a flowchart of decoding processing by a memory system of the second embodiment.

Dimension 1 low-reliability location information memory 213-2, dimension 2 low-reliability location information memory 223-2: LMEM FIG. 12 is a flowchart showing an example of the decoding processing by the memory system of the present embodiment. FIG. 12 shows an example of decoding processing for a two-dimensional error-correction code.

The control unit 11 reads the error-correction code from the non-volatile memory 20 and obtains the read information (step S201). The control unit 11 transfers the obtained read information to the read information memory 201 and stores the information (step S202).

The SISO decoding unit 182-2 executes initialization processing (step S203). The initialization processing includes, for example, the following processing.

Store the read information transferred from the control unit 11 in the read information memory 201 (HMEM, CMEM).

Set the dimension to be decoded (decoding target dimension: row or column).

Calculate the syndrome value of each component code from the hard bit data stored in HMEM and store the calculated value in SMEM.

Empty the entries of FMEM.

Initialize the reliability information memory 231 to 0.

Initialize LMEM.

As described above, the initialization processing of step S203 includes the initialization of LMEM. As in the modification example described later, the initialization of LMEM may not be included in the initialization processing of step S203.

After the initialization processing, the SISO decoding unit 182-2 executes component code decoding processing (component code decoding processing) of the set dimension (step S204). The details of the component code decoding processing will be described later.

The SISO decoding unit 182-2 determines whether or not the decoding is successful (step S205). Successful decoding may mean, for example, that a decoded word that can be determined to be correct is found.

When the decoding is not successful (NO in step S205), the SISO decoding unit 182-2 determines whether or not the number of iterations of the present operation reaches a preset specified value (step S207). When the specified value is not reached (NO in step S207), the SISO decoding unit 182-2 switches the decoding target dimension to another dimension, increases the number of iterations by 1, returns to step S204, and executes the subsequent operations. When the specified value is reached (YES in step S207), the SISO decoding unit 182-2 notifies an external control unit or the like of the failure of the decoding (step S208), and ends the decoding processing. The number of iterations may be, for example, the number of times the component code decoding processing of step S204 is repeated.

When the decoding is successful (YES in step S205), the SISO decoding unit 182-2 notifies the external control unit or the like of the decoded word with the success of the decoding (step S206), and ends the decoding processing. The SISO decoding unit 182-2 modifies the hard bit data written in the read information memory 201 by using, for example, information stored in the reliability information memory 231, the dimension 1 correction information memory 212, and the dimension 2 correction information memory 222, which is obtained by the decoding processing. The SISO decoding unit 182-2 uses the corrected hard bit data as a final output (output decoded word).

For example, the SISO decoding unit 182-2 calculates the logarithmic posterior probability ratio for each bit of the hard bit data in the read information memory 201 by using the above Equation (1). The SISO decoding unit 182-2 determines whether to modify the hard bit data corresponding to each bit stored in the read information memory 201 based on the positive/negative of the calculated logarithmic posterior probability ratio. The SISO decoding unit 182-2 modifies the hard bit data as determined and uses the modified data as an output decoded word.

Figure 13:
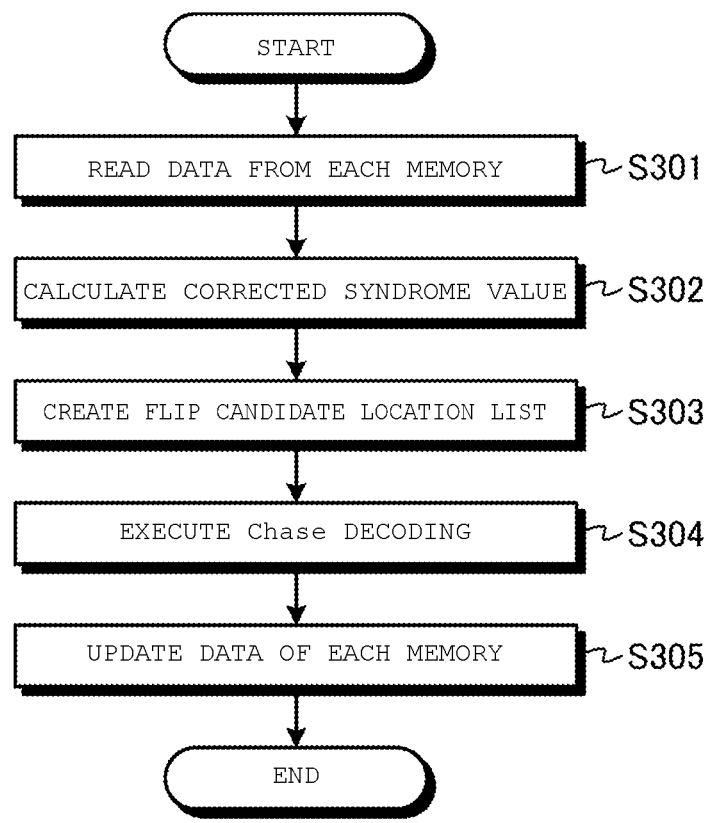
FIG. 13 is a flowchart of component code decoding processing.

Next, the details of the component code decoding processing in step S204 will be described. FIG. 13 is a flowchart showing an example of the component code decoding processing.

In FIG. 13, the case of decoding the component code of a dimension 1 (row) will be described as an example, but the same procedure is applicable to other dimension (dimension 2: column). Further, in the following, an example will be described in which Chase decoding is used in which the bit having a high probability of error is flipped (inverted) and then a limit distance decoding is performed. The applicable decoding method is not limited to Chase decoding, and any decoding method may be used.

The dimension 1 soft-input value calculation unit 112-2 of the SISO decoding unit 182-2 reads out the data used for decoding from each memory (step S301). For example, the dimension 1 soft-input value calculation unit 112-2 reads a syndrome value (dimension 1 syndrome value) from SMEM, reads correction information (dimension 1 correction information) from FMEM, reads the low-reliability location information (dimension 1 low-reliability location information) from LMEM, and reads the reliability information from the reliability information memory 231.

The dimension 1 soft-input value calculation unit 112-2 calculates the syndrome value (value corresponding to the syndrome value calculated from the hard determination value of the soft-input value) corresponding to the hard determination value of the soft-input value by using each read information (step S302). Details of step S302 will be described later. The syndrome value corresponding to the hard determination value of the soft-input value may be referred to as a modified syndrome value below.

The dimension 1 SISO decoding unit 113 creates a flip candidate location list to be used in Chase decoding by using the dimension 1 correction information, the dimension 1 low-reliability location information, and the like (step S303). The flip candidate location list is information including candidates for a flip location (inversion location) indicating the location of the bit to be flipped. Details of the method for creating the flip candidate location list will be described later.

The dimension 1 SISO decoding unit 113 executes Chase decoding by using the modified syndrome value obtained in step S302 and the flip candidate location list obtained in step S303 (step S304).

The dimension 1 SISO decoding unit 113 stores correction information indicating the corrected bit location by Chase decoding in the dimension 1 correction information memory 212 and the dimension 2 correction information memory 222, and stores the reliability information obtained as a result of Chase decoding in the reliability information memory 231 (step S305).

Next, Modification Example 1 and Modification Example 2 in which the initialization timing of LMEM is changed will be described.

Modification Example 1

Figure 14:
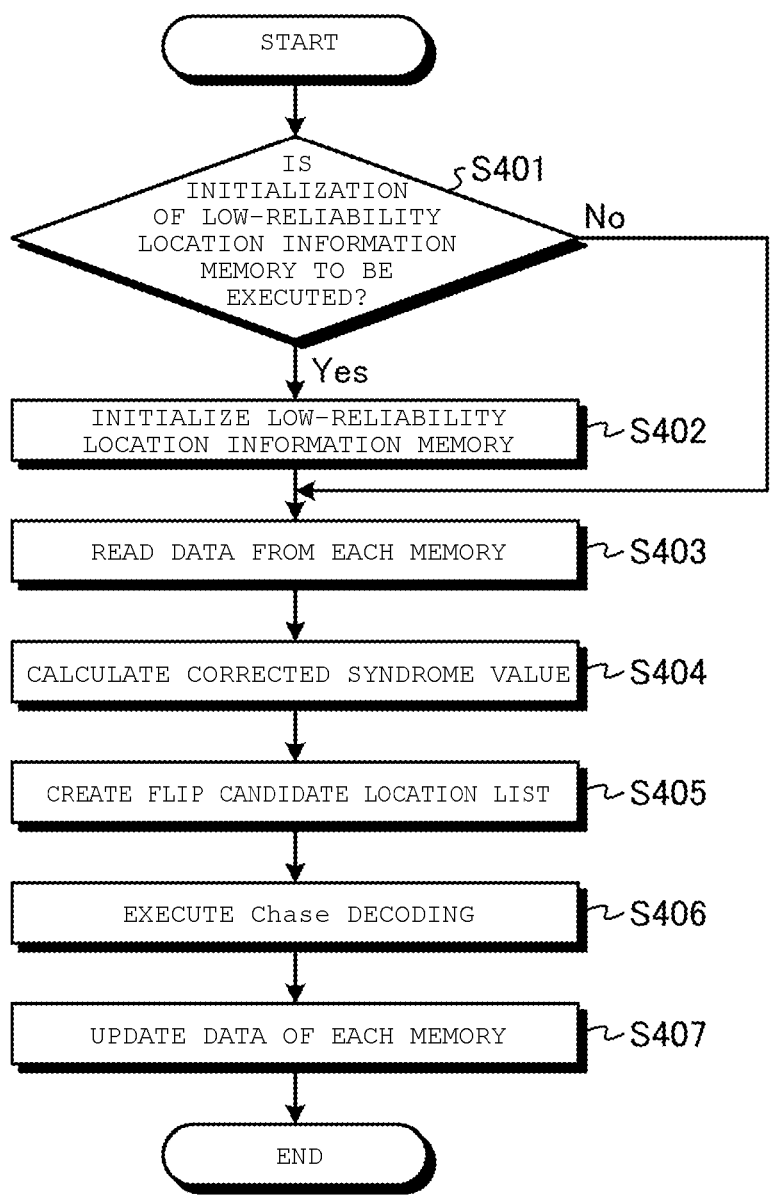
FIG. 14 is a flowchart of component code decoding processing of Modification Example 1.

In Modification Example 1, the initialization of LMEM is not executed in the initialization processing of step S203 of FIG. 12, but the initialization of LMEM is executed in the component code decoding processing of step S204. FIG. 14 is a flowchart of the component code decoding processing of Modification Example 1. In the following, the case of decoding the component code of the dimension 1 (row) will be described as an example, but the same procedure is applicable to other dimension (dimension 2, column).

The dimension 1 low-reliability location information calculation unit 114-2 determines whether or not to execute the initialization of LMEM (dimension 1 low-reliability location information memory 213-2) (step S401). For example, when the dimension 1 low-reliability location information calculation unit 114-2 first executes the component code decoding processing for the component code set as a decoding target in the decoding processing started according to FIG. 12, it is determined to execute the initialization of LMEM. In the other cases, the dimension 1 low-reliability location information calculation unit 114-2 determines that LMEM initialization is not executed.

When it is determined to execute the initialization of LMEM (YES in step S401), the dimension 1 low-reliability location information calculation unit 114-2 initializes the entries of the component code set as the decoding target among the entries of LMEM. For example, when the component code decoding processing is first executed for the row 0 in FIG. 11, the dimension 1 low-reliability location information calculation unit 114-2 calculates the dimension 1 low-reliability location information for the row 0, and stores the calculated dimension 1 low-reliability location information in the dimension 1 low-reliability location information memory 213-2.

In the present modification example, since only the entries required for each component code are targeted for initialization, the processing time is shortened. Further, it is possible to parallelize processing including initialization of LMEM for a certain component code and another processing for another component code. As a result, the number of processing cycles required for the entire decoding processing can be relatively reduced.

After executing the initialization of LMEM, and when it is not determined to execute the initialization of LMEM (NO in step S401), the dimension 1 low-reliability location information calculation unit 114-2 executes the subsequent steps S403 to S407. Since steps S403 to S407 are the same as steps S301 to S305 of FIG. 13, detailed description thereof will be omitted.

Modification Example 2

The embodiment and Modification Example 1 are examples provided with low-reliability location information memories (dimension 1 low-reliability location information memory 213-2 and dimension 2 low-reliability location information memory 223-2) for storing low-reliability location information for each of the M component codes. For example, as shown in FIG. 11, in the case of a 4-by-4 product code (M=8), the dimension 1 low-reliability location information memory 213-2 stores the dimension 1 low-reliability location information for each of the four component codes in the row direction, and the dimension 2 low-reliability location information memory 223-2 stores the dimension 2 low-reliability location information for each of the four component codes in the column direction.

In Modification Example 2, an example provided with a low-reliability location information memory including a storage area for storing low-reliability location information on Q (Q<M) component codes smaller than M component codes will be described. The dimension 1 low-reliability location information memory 213-2 and the dimension 2 low-reliability location information memory 223-2 may be configured to store low-reliability location information of Q component codes in total, or one low-reliability location information memory that integrates the dimension 1 low-reliability location information memory 213-2 and the dimension 2 low-reliability location information memory 223-2 may be configured to store the low-reliability location information of Q component codes. In the former case, for example, the dimension 1 low-reliability location information memory 213-2 and the dimension 2 low-reliability location information memory 223-2 may store low-reliability location information of Q'(Q'<(M/2)) component codes, respectively.

In the present modification example, LMEM is initialized every time in the component code decoding processing. For example, when the component code decoding processing is executed for a certain component code, the low-reliability location information is calculated for the component code each time, and the calculated low-reliability location information is stored in the unused storage area in the storage area of the low-reliability location information for Q pieces. When the component code decoding processing of the component code is completed, the stored low-reliability location information is deleted.

The present modification example can be interpreted as a configuration in which a storage area that can store low-reliability location information of a number (Q) of component codes smaller than the number (M) of all component codes is used.

Q may be any value as long as Q is 1 or more and less than M. For example, in the case of a configuration in which processing for a plurality of component codes is executed in parallel by pipeline processing or the like, Q may be a value corresponding to the number of stages of pipeline processing.

Figure 15:
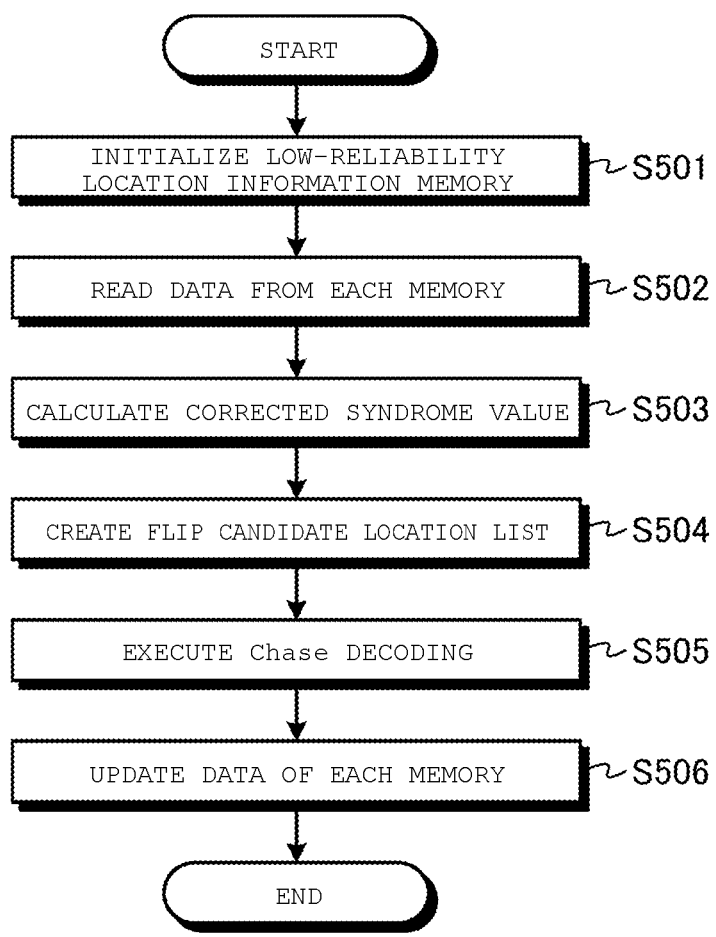
FIG. 15 is a flowchart of component code decoding processing of Modification Example 2.

FIG. 15 is a flowchart of the component code decoding processing of Modification Example 2. In the following, the case of decoding the component code of the dimension 1 (row) will be described as an example, but the same procedure is applicable to other dimension (dimension 2, column).

The dimension 1 low-reliability location information calculation unit 114-2 initializes the dimension 1 low-reliability location information memory 213-2 for the component code set as a decoding target (step S501). For example, the dimension 1 low-reliability location information calculation unit 114-2 calculates the dimension 1 low-reliability location information for the component code, and stores the calculated dimension 1 low-reliability location information in the unused storage area of the dimension 1 low-reliability location information memory 213-2.

Since steps S502 to S506 are the same as steps S301 to S305 of FIG. 13, detailed description thereof will be omitted.

According to the present modification example, the size of the low-reliability location information memory can be further reduced. Therefore, for example, the circuit scale of the memory system 1 can be reduced.

Next, the details of the calculation method of the modified syndrome value in step S302 will be described. In the calculation of the modified syndrome value, the calculation of the soft-input value is executed.

In the following, a case where the dimension 1 soft-input value calculation unit 112-2 calculates the dimension 1 soft-input value and the dimension 1 modified syndrome value in the component code decoding processing of the dimension 1 component code will be described as an example. Further, in the following, a case where the correction information includes the corrected location, the error flag, and the other dimension error flag, and the soft-input value is calculated at the corrected location corresponding to a certain entry (correction information) in FMEM will be described. Further, in the following, the component code in the other dimension that intersects at the corrected location to be processed is referred to as "the component code of interest in the other dimension". Therefore, in this example, the other dimension is a dimension 2. The same procedure as for the dimension 1 is applicable to the dimension 2.

The dimension 1 soft-input value calculation unit 112-2 inputs the following input information and outputs a soft-input value $L_{in}$ as output information.

Input information:
L (channel value): $L_L$ for low-reliability bits, $L_H$ for non-low-reliability bits ($|L_L| < |L_H|$)
$f_1$: Error flag (1 when determined to be an error, 0 otherwise)
$f_2$: The other dimension error flag (1 when determined to be an error, 0 otherwise)
$\Phi_1$: Decoding reliability of the component code of interest in the decoding target dimension (probability value of 0 or more and 1 or less)
$\Phi_2$: Decoding reliability of the component code of interest in the other dimension (probability value of 0 or more and 1 or less)

The reliability information memory 231 may store the probability value indicating the decoding reliability as it is (with a certain quantization bit width), or may store the discrete value corresponding to the decoding reliability. In the latter case, the dimension 1 soft-input value calculation unit 112-2 may convert the discrete value stored when calculating the soft-input value (by table lookup or the like) into a probability value.

The soft-input value $L_{in}$, which is the output information, is calculated by using the following Equations (2) to (4).

[Equation 2]
$$L_{in} = L + h(L', f_2, \phi_2) \tag{2}$$

[Equation 3]
$$h(l, f, \phi) = g(l, f, \phi) - l \tag{3}$$

[Equation 4]
$$g(l, f, \phi) = (-1)^f \ln\left[\frac{\phi + \exp[(-1)^f l]}{1 - \phi}\right] \tag{4}$$

L' of Equation (2) is calculated by any of the following Equations (5) to (7).

[Equation 5]
$$L' = L \tag{5}$$

[Equation 6]

When $\varphi_1 > \varphi_2, L' = g(L, f_1, \varphi_1)$, when $\varphi_1 \leq \varphi_2, L' = L \tag{6}$

[Equation 7]

When $\varphi_1 \geq \varphi_2, L' = g(L, f_1, \varphi_1)$, when $\varphi_1 < \varphi_2, L' = L \tag{7}$ $L_{in}$ may be calculated by a circuit that executes calculation according to each of the above equations, or may be calculated by using a table in which input information and output information are associated with each other. Further, in the subsequent processing, the absolute value of $L_{in}$ and the code of $L_{in}$ may be required. In such a case, the processing of extracting only the absolute value or the code may be performed after obtaining $L_{in}$, or a table in which the input information is associated with the absolute value of $L_{in}$ and a table in which the input information is associated with the code of $L_{in}$ may be used.

As described above, in the present embodiment, the soft-input value is calculated based on the correction information, the reliability information, the syndrome value, and the low-reliability location information. This soft-input value can be interpreted as being calculated from an approximately obtained external value. That is, unlike the turbo decoder of FIG. 3 that uses Max-log-MAP decoding or the like as shown in FIG. 3, in the present embodiment, it is not necessary to store the external value in the external value memory. Therefore, it is possible to avoid an increase in the amount of memory required for decoding. In addition, since the channel value can be used properly between the location with low reliability and the locations other than the location with low reliability by using the low-reliability location information, it is possible to calculate a more accurate soft-input value and improve the correction ability.

The modified syndrome value is calculated by the following procedure.

(B1) The code (positive or negative) of the soft-input value is obtained for each of the "bits stored in FMEM and determined to be an error in the other dimension".

(B2) For each bit location where the code of the soft-input value is opposite to the code of the channel value, the "flip"

of the bit at the corresponding location is reflected in the syndrome value read from SMEM and output as a modified syndrome value.

When the correction information includes the above-mentioned inversion flag, whether the code of the soft-input value is opposite to the code of the channel value can be determined by using this inversion flag.

Figure 16:
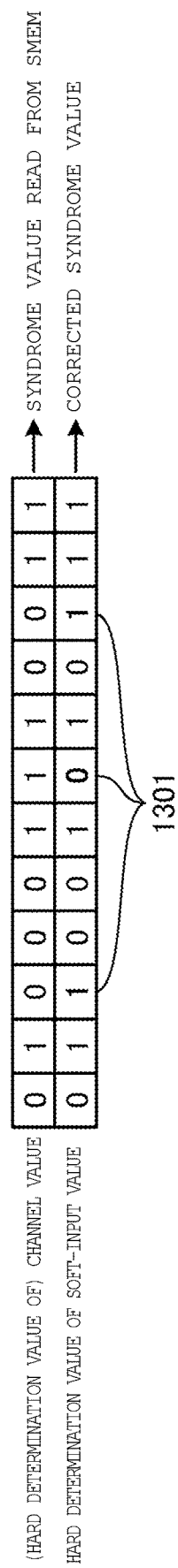
FIG. 16 is a diagram showing a calculation example of a modified syndrome value.

FIG. 16 is a diagram showing a calculation example of the modified syndrome value. As shown in FIG. 16, the syndrome value read from SMEM corresponds to the "syndrome value calculated from the hard determination value of the channel value". Modifying this syndrome value so that it becomes the "syndrome value calculated from the hard determination value of the soft-input value" corresponds to the calculation of the modified syndrome value.

There is a possibility that the code is inverted between the channel value and the soft-input value only for "bits stored in FMEM and determined to be an error in the other dimension". Therefore, the soft-input value need only be calculated at the corresponding location. In FIG. 16, the location 1301 corresponds to the location where the soft-input value is calculated.

Next, the details of the method for creating the flip candidate location list in step S303 will be described. In Chase decoding, the limit distance decoding is executed after flipping the bit with a high probability of error. Therefore, for the preparation, a flip candidate location list that defines candidates for the location of the bit to be flipped is created.

Hereinafter, three examples (M1), (M2), and (M3) of the method for creating a flip candidate location list will be described.

(M1) Creation Method 1

According to the following priority order, a maximum of Y addresses in the component code of the bit to be flipped (Y is a predetermined maximum value) are acquired, and a flip candidate location list indicating the acquired addresses is created.

Priority 1: bits stored in LMEM
Priority 2: bits stored in FMEM and determined to be an error in the other dimension
Priority 3: intersection bit with component code in the other dimension with decoding reliability=0
Priority 4: parity bit (M2) Creation Method 2

Priority 1 of Creation Method 1 is replaced with the following (priorities 2 to 4 are the same as Creation Method
Priority 1: bits stored in LMEM and whose absolute value of the soft-input value is equal to or less than a threshold value Th.

(M3) Creation Method 3

(M3-1) For each of the "bits stored in FMEM and determined to be an error in the other dimension", the absolute value of the soft-input value is obtained.

(M3-2) For each of the bits to be processed in (M3-1), the absolute value of the soft-input value is compared with threshold values $Th_L$ and $Th_H$. ($Th_L < Th_H$). If the absolute value is $Th_L$ or less, the corresponding bit is classified into a set SL, and if the absolute value is greater than $Th_L$ and equal to or less than $Th_H$, the corresponding bit is classified as a set SH. When the absolute value is larger than $Th_H$, the corresponding bit is not classified into any set and is discarded. $Th_L$ and $Th_H$ are defined as, for example, values corresponding to the LLR absolute values of the low-reliability bit and the high-reliability bit, respectively.

(M3-3) According to the following priority order, a maximum of Y addresses in the component code of the bit to be flipped (Y is a predetermined maximum value) are acquired, and a flip candidate location list indicating the acquired addresses is created.

Priority 1: bits classified into the set SL
Priority 2: bits stored in LMEM
Priority 3: bits classified into the set SH
Priority 4: intersection bit with component code in the other dimension with decoding reliability=0
Priority 5: parity bit As a method of determining the flip location, for example, a method of calculating the soft-input value, sorting the soft-input value by the absolute value, and determining the location of a certain number of bits in ascending order of the absolute value of the soft-input value as the flip location can be considered. In the present embodiment, the flip location is determined by using the correction information and the low-reliability location information stored for each component code. As a result, the processing time can be shortened.

The creation method 2 is different from the creation method 1 in the method of determining the bit of priority 1. That is, not only is it determined whether the bit is stored in LMEM, but it is also determined whether the absolute value of the soft-input value is a bit equal to or less than the threshold value Th. This makes it possible to eliminate bits that no longer have low reliability during decoding. As a result, it is possible to increase the probability of finding the correct decoded word in Chase decoding, and to reduce the size of the flip candidate location list to shorten the processing time. Further, since the calculation target of the absolute value of the soft-input value is only the bits stored in LMEM, an increase in the processing time can be reduced.

The present embodiment utilizes the fact that the bit location where the absolute value of the soft-input value may be relatively small is one of the following, and the number thereof is smaller than the component code length.

The location of the bit determined to have low reliability in the read information The location of the bit whose external value has the opposite sign to the channel value (which is determined to be an error in the other dimension)

Next, an example of the procedure of Chase decoding will be described. An example will be described in which the dimension 1 SISO decoding unit 113 executes Chase decoding as dimension 1 SISO decoding.

The dimension 1 SISO decoding unit 113 obtains the corrected bit location and the reliability information by decoding in the following procedure using a modified syndrome value s' and the flip candidate location list.

(E3-1) With t, f (t≤m and f≤t, m is the size of the flip candidate location list) as any constants, f candidates are selected from the flip location candidates stored in the flip candidate location list. The following processing (E3-1-1) is performed for each combination of $_tC_f$ selections.

(E3-1-1) A syndrome value s" obtained by flipping the bit at the selected location is calculated from s'. Then, syndrome decoding is performed by using s" to obtain a corrected bit location e. Further, reliability information pr of the dimension 1 component code is obtained from corrected bit locations e and f flip locations, the reliability information stored in the reliability information memory 231, and the low-reliability location information.

(E3-2) It is assumed that (e^, pr^) is the set with the maximum reliability information among the sets of corrected bit locations and reliability information obtained for each combination of selections in $_tC_f$.

(E3-3) The corrected bit location e^ and the reliability information pr^ are output.

Modification Example 3

Figure 17:
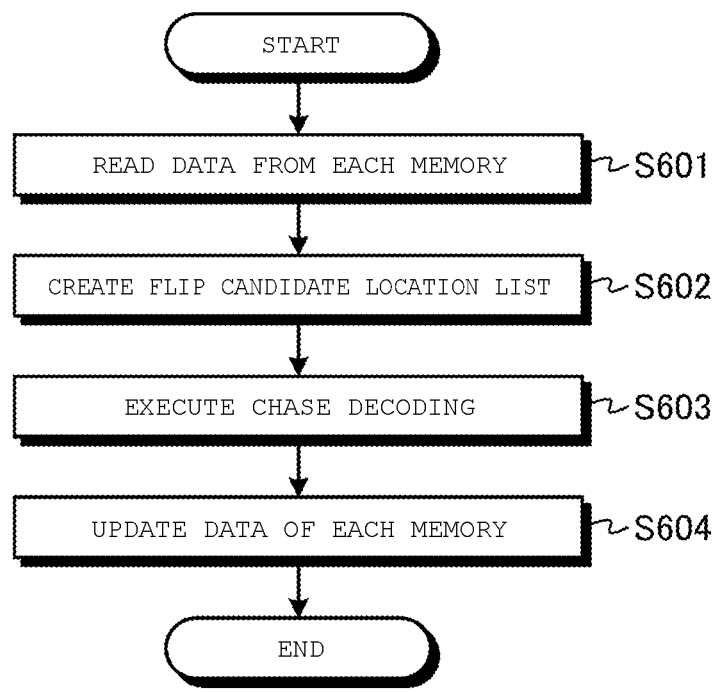
FIG. 17 is a flowchart of component code decoding processing of Modification Example 3.

In Modification Example 3, an example of updating SMEM with the calculated modified syndrome value will be described. FIG. 17 is a flowchart showing an example of the component code decoding processing of Modification Example 3. FIG. 17 shows a modification example of the above-described embodiment (FIGS. 12 and 13, and the like) in which the initialization of LMEM is executed in the decoding processing, but the same procedure is applicable to the above-mentioned Modification Example 1 and Modification Example 2.

In the present modification example, for example, the calculation processing of the modified syndrome value corresponding to step S302 in FIG. 13 is not executed. Instead, in the data update processing (step S604) of each memory corresponding to step S305 in FIG. 13, the modified syndrome value calculation processing and the SMEM update processing based on the calculated modified syndrome value are executed.

Step S601, step S602, and step S603 of FIG. 17 are the same as steps S301, S303, and S304 of FIG. 13.

In the Chase decoding in step S603, the syndrome value stored in SMEM is used as the modified syndrome value. For example, in first component code decoding processing when the component code decoding processing (step S204) is executed a plurality of times in FIG. 12, SMEM is not updated with the modified syndrome value, but the syndrome value read from SMEM may be used as it is.

In step S604, in addition to the same processing as in step S305, the following SMEM update processing is executed.

(U1) Update of SMEM corresponding to the decoding target dimension: read the syndrome value from SMEM of the decoding target dimension, execute the following processing for each corrected location, and write the updated syndrome value back to SMEM of the decoding target dimension.

(U1-1) Obtain the code of the soft-input value at the start of the decoding processing at the corresponding location and the code of the soft-input value after Chase decoding with the corresponding component code.

(U1-2) Compare the two codes obtained in (U1-1), and if the codes are different, reflect the "flip" of the bit at the corresponding location in the syndrome value. If the codes are the same, do nothing.

(U2) Execute the update of SMEM corresponding to the other dimension: the following processing for each corrected location.

(U2-1) In the other dimension, obtain the code of the soft-input value at the start of the decoding processing at the corresponding location and the code of the soft-input value after Chase decoding with the corresponding component code.

(U2-2) Compare the two codes obtained in (U2-1), and if the codes are different, read the syndrome value from the SMEM of the component code in the other dimension of the corresponding location, reflect the "flip" of the bit at the corresponding location in the syndrome value, and write back to the SMEM. If the codes are the same, do nothing.

The soft-input value at the start of the decoding processing is calculated by, for example, the above Equations (2) to (4), using the correction information at the start of decoding processing with the corresponding component code, the decoding reliability, and the low-reliability location information.

The soft-input value after Chase decoding with the corresponding component code is calculated by, for example, the above Equations (2) to (4), using the correction information after Chase decoding with the corresponding component code (step S603), the decoding reliability, and the low-reliability location information.

The update of SMEM of the decoding target dimension and the other dimension may be executed in parallel for each corrected location. In order to simplify the processing, the code of the soft-input value at the start of the decoding processing may be stored, and the stored code may be used in the above processing ((U1-1) and (U2-1)).

By updating the SMEM of the component code in the decoding target dimension and the other dimension in this way, the "syndrome value calculated from the hard determination value of the soft-input value" is stored in the SMEM.

Modification Example 4

In the above-described embodiment and modification examples, one low-reliability location information memory (dimension 1 low-reliability location information memory 213-2 and dimension 2 low-reliability location information memory 223-2) is used for each dimension. In Modification Example 4, an example in which the degree of low reliability (low-reliability level) is represented by u (u is an integer of 2 or more), and u low-reliability location information memories corresponding to each low-reliability level are used for each dimension will be described.

For example, when a plurality of pieces of soft bit data SB1 to SBX (X≥2) are used, u low-reliability levels may be determined according to the combination of soft bit data. As described above, since the LLR value is determined by the LLR table in which the set of hard bit data and soft bit data, and the channel value are associated with each other, u low-reliability levels may be determined according to the absolute value of LLR.

The u low-reliability location information memories are referred to when creating a flip candidate location list as follows. The u low-reliability location information memories are expressed as $LMEM_1$, $LMEM_2$, ..., $LMEM_u$ in order from the lowest low-reliability level. Hereinafter, three examples (M4), (M5), and (M6) of a method for creating a flip candidate location list using the u low-reliability location information memories will be described.

(M4) Creation Method 4

According to the following priority order, a maximum of Y addresses in the component code of the bit to be flipped (Y is a predetermined maximum value) are acquired, and a flip candidate location list indicating the acquired addresses is created.

Priority 1: bits stored in $LMEM_1$
Priority 2: bits stored in $LMEM_2$ (omitted)
Priority u: bits stored in $LMEM_u$
Priority u+1: bits stored in FMEM and determined to be an error in the other dimension
Priority u+2: intersection bit with component code in the other dimension with decoding reliability=0
Priority u+3: parity bit (M5) Creation Method 5

According to the following priority order, a maximum of Y addresses in the component code of the bit to be flipped (Y is a predetermined maximum value) are acquired, and a flip candidate location list indicating the acquired addresses is created. The LLR absolute values corresponding to u low-reliability levels are $Th_1$, $Th_2$, ..., $Th_u$.

Priority 1: bits stored in $LMEM_1$ and whose absolute value of the soft-input value is $Th_1$ or less
Priority 2: bits stored in $LMEM_2$ and whose absolute value of the soft-input value is $Th_2$ or less (omitted)
Priority u: bits stored in $LMEM_u$ and whose absolute value of the soft-input value is $Th_u$ or less
Priority u+1: bits stored in FMEM and determined to be an error in the other dimension
Priority u+2: intersection bit with component code in the other dimension with decoding reliability=0
Priority u+3: parity bit (M6) Creation Method 6

(M6-1) The LLR absolute values corresponding to u low-reliability levels are $Th_1, Th_2, \ldots, Th_u$. Further, the high-reliability LLR absolute value (minimum value when there are a plurality of values) is set to $Th_{u+1}$.

(M6-2) For each of the "bits stored in FMEM and determined to be an error in the other dimension", the absolute value of the soft-input value is obtained.

(M6-3) For each of the bits to be processed in (M6-2), the absolute value of the soft-input value is compared with (u+1) threshold values $Th_1, \ldots, Th_{u+1}$, respectively. The target bits are classified into a set $S_k$ (k=1, ..., u+1) or discarded according to the comparison result. For example, if the absolute value of the soft-input value is expressed as $|L_{in}|$, when $|L_{in}|<Th_1$, the target bits are classified into a set $S_1$, and when $Th_k \leq Th_{k+1}$, the target bits are classified into a set $S_{k+1}$, and at other times, the target bits are discarded.

(M6-4) According to the following priority order, a maximum of Y addresses in the component code of the bit to be flipped (Y is a predetermined maximum value) are acquired, and a flip candidate location list indicating the acquired addresses is created.
Priority 1: bits classified into set $S_1$
Priority 2: bits stored in $LMEM_1$
Priority 3: bits classified into set $S_2$
Priority 4: bits stored in $LMEM_2$ (omitted)
Priority 2u−1: bits classified into set $S_u$
Priority 2u: bits stored in $LMEM_u$
Priority 2u+1: bits classified into set $S_{u+1}$
Priority 2u+2: intersection bit with component code in the other dimension with decoding reliability=0
Priority 2u+3: parity bit When calculating the soft-input value, for example, the low-reliability location information stored in predetermined low-reliability location information memory is configured to be used among the u low-reliability location information memories.

Modification Example 5

Modification Example 5 is provided with a function of reducing the amount of information stored in the correction information memory in order to avoid a situation in which "the amount of correction information data exceeds the amount of data that can be stored in the correction information memory". For example, when the reliability information is sufficiently high, the decoder 18 modifies the hard bit data stored in HMEM of the read information memory 201 according to the correction information, instead of storing the correction information in the correction information memory. The reliability information is sufficiently high, for example, when the amount of the reliability information is larger than a threshold value. Further, the decoder 18 also modifies each syndrome value stored in the syndrome value memory (dimension 1 syndrome value memory 211 and dimension 2 syndrome value memory 221) so as to be consistent with the modified hard bit data. In this way, the detected error information can be reflected in the hard bit data without storing the correction information in the correction information memory.

As a method of reducing the amount of memory required for decoding, for example, a method of storing the intermediate information (for example, MAP decoded word and reliability information indicating the correctness of the decoded word) necessary for calculating an external value instead of storing the external value itself in the external value memory and generating the external value by using the intermediate information when the external value is needed can be considered. However, in such a method, since the amount of data of the MAP decoded word depends on the code length, the effect of reducing the amount of memory is reduced when the code length is long.

In the present embodiment, the decoding processing including the calculation of the external value is executed by using the syndrome value, the correction information, and the low-reliability location information that do not depend on the code length. This makes it possible to reduce the amount of memory required for decoding. Further, since the reading/writing time of the information used for the decoding processing is shortened, the processing time of the decoding processing can be shortened.

As described above, in the second embodiment, the total capacity of the required memory area can be reduced even for the memory for storing the low-reliability location information (low-reliability location information memory).

Third Embodiment

In the first embodiment and the second embodiment, an example in which the number of component codes M can be set in two stages of 100 (the number of component codes: small) and 500 (the number of component codes: large) has been described. In a third embodiment, an example in which the number of component codes M can be set to three or more stages will be described. Although the present embodiment illustrates an example of determining the number of pieces of correction information as in the first embodiment, the same procedure is applicable when determining the number of pieces of low-reliability location information as in the second embodiment.

Figure 18:
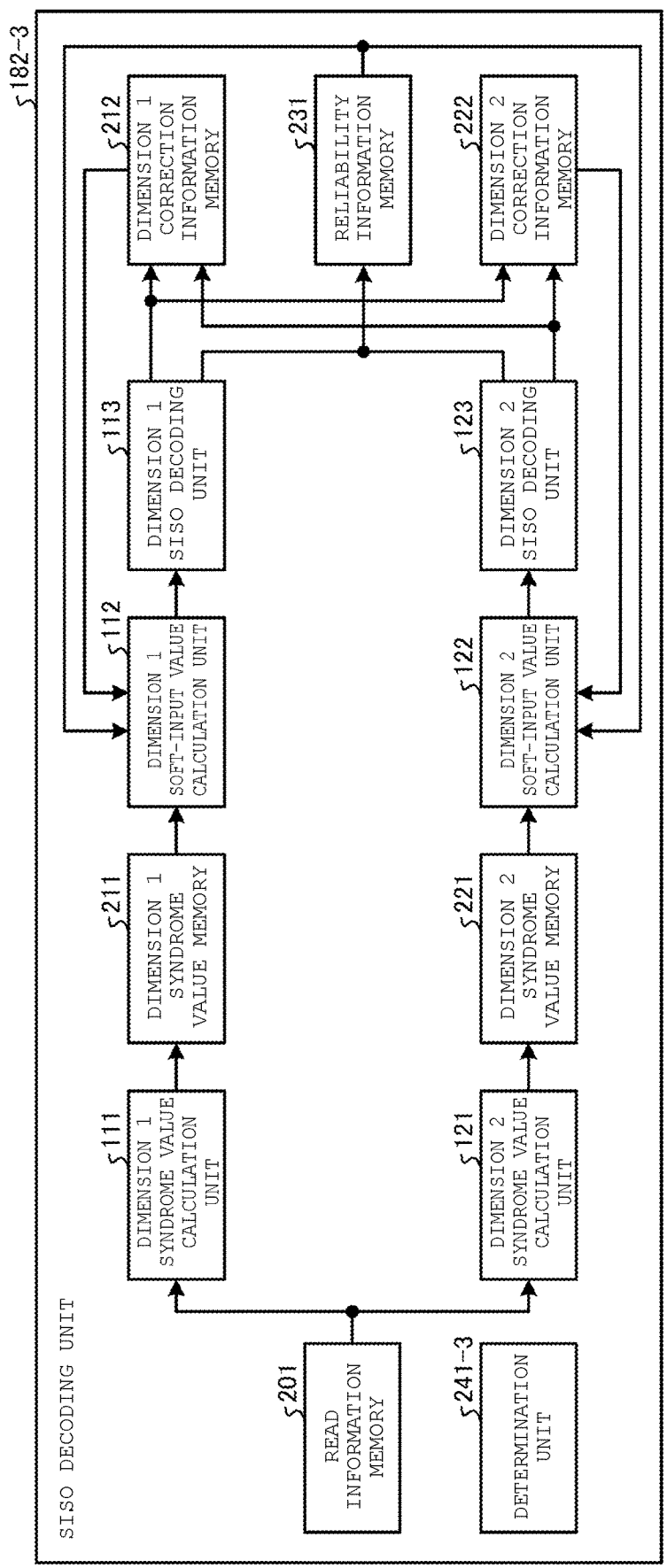
FIG. 18 is a block diagram of a SISO decoding unit according to a third embodiment.

In a memory system of the third embodiment, the function of the SISO decoding unit is different from that of the first embodiment. Hereinafter, the function of an SISO decoding unit 182-3 of the third embodiment will be described. FIG. 18 is a block diagram showing a schematic configuration example of the SISO decoding unit 182-3.

As shown in FIG. 18, the SISO decoding unit 182-3 includes a read information memory 201, a dimension 1 syndrome value calculation unit 111 and a dimension 1 syndrome value memory 211, a dimension 1 soft-input value calculation unit 112, a dimension 1 SISO decoding unit 113, a dimension 1 correction information memory 212, a dimension 2 syndrome value calculation unit 121, a dimension 2 syndrome value memory 221, a dimension 2 soft-input value calculation unit 122, a dimension 2 SISO decoding unit 123, a dimension 2 correction information memory 222, a reliability information memory 231, and a determination unit 241-3.

In the third embodiment, the function of the determination unit 241-3 is different from that of the first embodiment. Since other configurations are the same as those of the first embodiment, the same reference numerals are given and the description thereof will be omitted.

The determination unit 241-3 determines the number of pieces of correction information r by the number of pieces of correction information r=S/M (rounded down to the nearest whole number) by using a maximum value S of the total number of pieces of correction information and the number of component codes M. FIG. 19 is a diagram showing an example of the number of pieces of correction information calculated for the number of component codes M in seven stages.

In the example of FIG. 19, it is assumed that the total capacity of the memory area of FMEM is determined so that six pieces of correction information can be assigned to the maximum number of component codes 500. In this case, the maximum value S of the total number of pieces of correction information that can be stored in FMEM is 3000 (=500×6).

The determination unit 241-3 can calculate the address of the y-th component code as follows.

The correction information address of the y-th component code is from r(y−1)+1 to ry.

Fourth Embodiment

In a fourth embodiment, the number of pieces of information stored in the memory (the number of pieces of correction information and the number of pieces of low-reliability location information) is dynamically changed according to the state of the decoding processing. Although the present embodiment illustrates an example of determining the number of pieces of correction information as in the first embodiment, the same procedure is applicable when determining the number of pieces of low-reliability location information as in the second embodiment.

Figure 20:
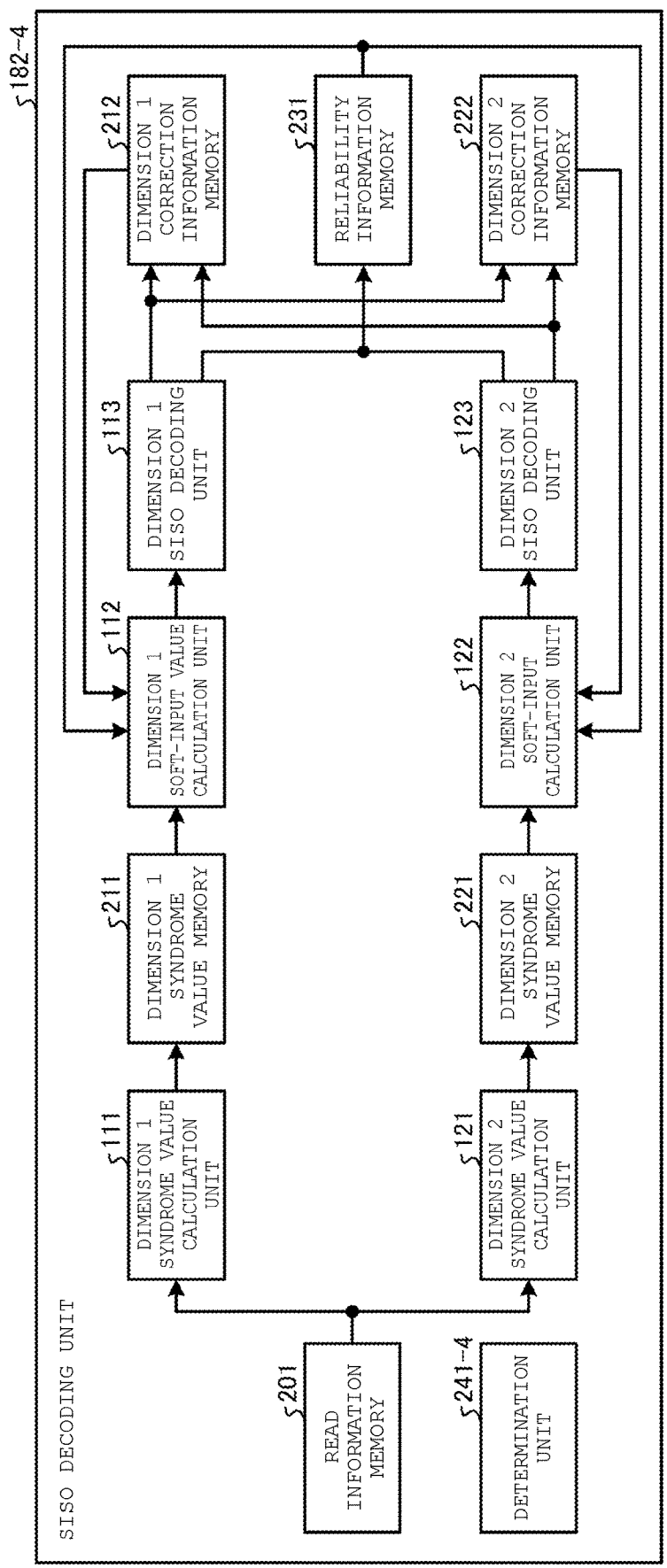
FIG. 20 is a block diagram of a SISO decoding unit according to a fourth embodiment.

In a memory system of the fourth embodiment, the function of the SISO decoding unit is different from that of the first embodiment. Hereinafter, the function of an SISO decoding unit 182-4 of the fourth embodiment will be described. FIG. 20 is a block diagram showing a schematic configuration example of the SISO decoding unit 182-4.

As shown in FIG. 20, the SISO decoding unit 182-4 includes a read information memory 201, a dimension 1 syndrome value calculation unit 111 and a dimension 1 syndrome value memory 211, a dimension 1 soft-input value calculation unit 112, a dimension 1 SISO decoding unit 113, a dimension 1 correction information memory 212, a dimension 2 syndrome value calculation unit 121, a dimension 2 syndrome value memory 221, a dimension 2 soft-input value calculation unit 122, a dimension 2 SISO decoding unit 123, a dimension 2 correction information memory 222, a reliability information memory 231, and a determination unit 241-4.

In the fourth embodiment, the function of the determination unit 241-4 is different from that of the first embodiment. Since other configurations are the same as those of the first embodiment, the same reference numerals are given and the description thereof will be omitted.

The determination unit 241-4 determines the number of pieces of correction information by using the number of component codes (the number of uncorrected component codes) that are not corrected (uncorrected component codes) among M component codes as a value based on the number of component codes. The number of uncorrected component codes can be changed according to the state of the decoding processing as follows. Therefore, the determination unit 241-4 dynamically determines the number of pieces of correction information according to the state of the decoding processing.

For example, when there is a high probability that a component code has been correctly corrected, the determination unit 241-4 determines that the component code has been corrected successfully, and defines the other component codes as uncorrected component codes. For example, when the same bit is corrected in the dimension 1 decoding (row) and the dimension 2 decoding (column), the determination unit 241-4 determines that there is a high probability that this component code has been correctly corrected. The determination unit 241-4 may determine that there is a high probability that the component code has been correctly corrected when the reliability information is larger than a threshold value, as in the above-mentioned Modification Example 5.

The determination unit 241-4 does not allocate the memory area of the correction information memory (FMEM) to the component code determined to have a high probability of being corrected correctly. The determination unit 241-4 calculates the number of pieces of correction information by using the number of uncorrected component codes (hereinafter, referred to as M') instead of the number of component codes M.

For example, the determination unit 241-4 determines the number of pieces of correction information r by the number of pieces of correction information r'=S/M' (rounded down to the nearest whole number) by using the maximum value S of the total number of pieces of correction information and the number of uncorrected component codes M'. FIG. 21 is a diagram showing an example of the number of pieces of correction information calculated for the number of uncorrected component codes M' in seven stages.

In the example of FIG. 21, it is assumed that the total capacity of the memory area of FMEM is determined so that six pieces of correction information can be assigned to the maximum number of component codes 500. In this case, the maximum value S of the total number of pieces of correction information that can be stored in FMEM is 3000 (=500×6). FIG. 21 shows an example of the number of pieces of correction information when it is assumed that the number of uncorrected component codes M' is about 80% of the number of component codes M. For example, the number of uncorrected component codes M' is calculated to be 400 (≈500×0.8) for the number of component codes M=500. In this case, the determination unit 241-4 calculates that the number of pieces of correction information r' is 7 (≈3000/400).

The determination unit 241-4 can calculate the address of the y-th component code as follows.

First, the determination unit 241-4 creates correspondence information indicating the correspondence between the M component codes and the uncorrected component codes, and stores the correspondence information in a storage area such as FMEM. FIG. 22 is a diagram illustrating an example of correspondence information. In FIG. 22, for example, among the eight component codes in the row direction, the component codes on the fifth, sixth, and eighth rows are uncorrected component codes, and the remaining component codes are corrected component codes. For example, the correspondence information is information associated with a number (y-th) indicating the order of the component codes, information "completed" indicating that an uncorrected component code has been corrected, or a number (z-th) indicating the order of the uncorrected component codes.

FIG. 22 shows an example in which numbers representing the order of component codes are independently assigned in a dimension 1 (row) and a dimension 2 (column), but the present disclosure is not limited thereto. For example, a plurality of dimensions may be collectively numbered.

The determination unit 241-4 obtains the number z of the uncorrected component code corresponding to the y-th component code with reference to the correspondence information. The determination unit 241-4 can calculate the address of the y-th component code by using the obtained z as follows.

The correction information address of the y-th component code is r'(z−1)+1 to r'z.

The timing for determining the number of pieces of correction information may be any timing during the decoding processing, and may be, for example, a timing when the number of iterations reaches a specific value of one or more.

In the present embodiment, a memory area for storing the correspondence information is required, but the influence on the amount of reduction in the memory capacity of FMEM is small. For example, when the size of the correction information is a fixed value of 15 bits and the number of component codes M is 500, the memory area is reduced by about 4.7 kilobytes. Even if 9 bits of correspondence information is required for each component code, the memory area to be increased for the correspondence information is about 562 bytes (≈500×9 bits).

Fifth Embodiment

In a fifth embodiment, an example of using correction information including further information indicating whether or not reliability is low will be described.

Figure 23:
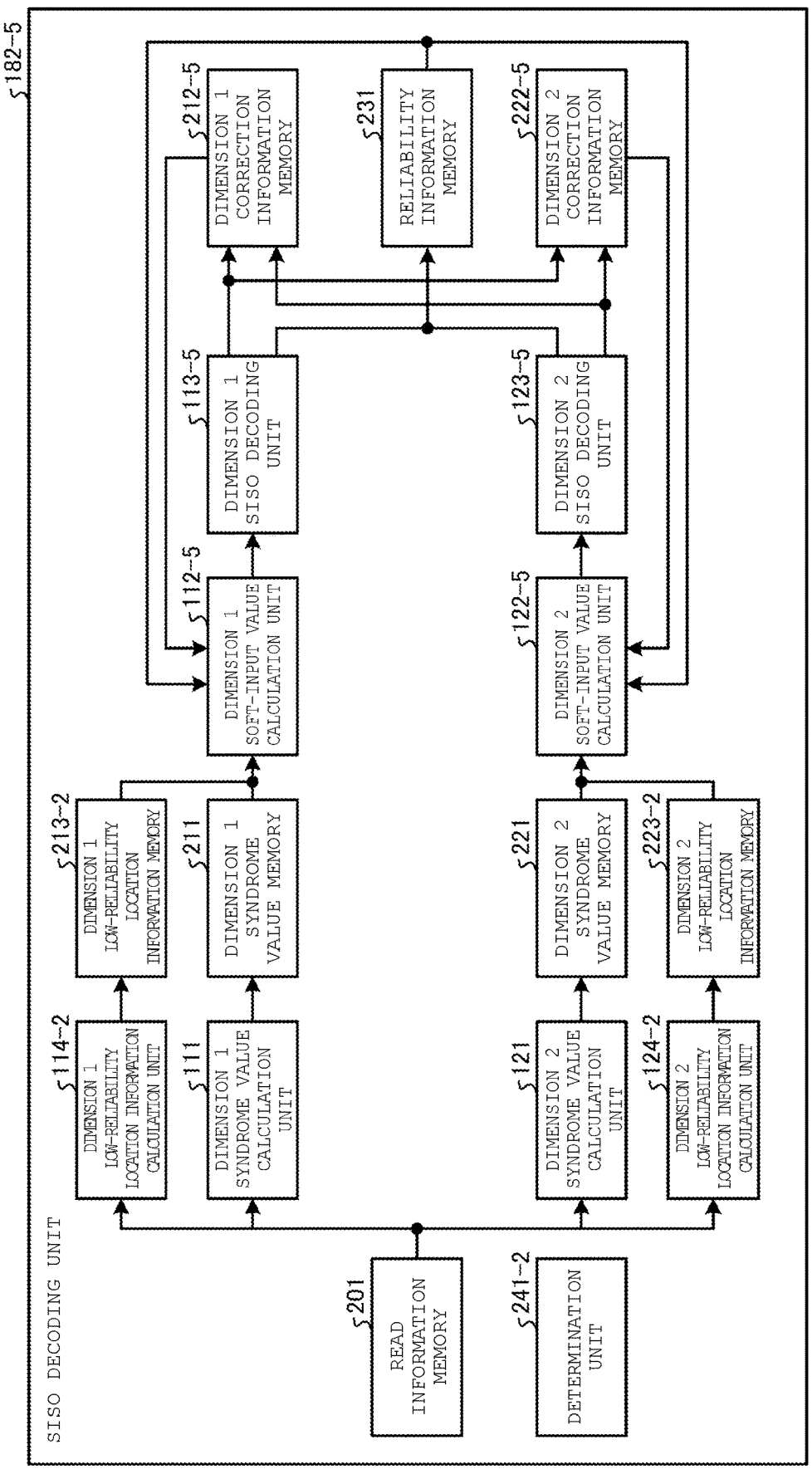
FIG. 23 is a block diagram of a SISO decoding unit according to a fifth embodiment.

In a memory system of the fifth embodiment, the function of the SISO decoding unit is different from that of the second embodiment. Hereinafter, the function of an SISO decoding unit 182-5 of the fifth embodiment will be described. FIG. 23 is a block diagram showing a schematic configuration example of the SISO decoding unit 182-5.

As shown in FIG. 23, the SISO decoding unit 182-5 includes a read information memory 201, a dimension 1 syndrome value calculation unit 111, a dimension 1 low-reliability location information calculation unit 114-2, a dimension 1 low-reliability location information memory 213-2, a dimension 1 syndrome value memory 211, a dimension 1 soft-input value calculation unit 112-5, a dimension 1 SISO decoding unit 113-5, a dimension 1 correction information memory 212-5, a dimension 2 syndrome value calculation unit 121, a dimension 2 syndrome value memory 221, a dimension 2 low-reliability location information calculation unit 124-2, a dimension 2 low-reliability location information memory 223-2, a dimension 2 soft-input value calculation unit 122-5, a dimension 2 SISO decoding unit 123-5, a dimension 2 correction information memory 222-5, a reliability information memory 231, and a determination unit 241-2. FIG. 10 shows an example in which the symbol of a code is two-dimensional, but as described above, the SISO decoding unit 182-5 may have a configuration corresponding to a multidimensional error-correction code other than a two-dimensional error-correction code.

In the fifth embodiment, the functions of the dimension 1 soft-input value calculation unit 112-5, the dimension 1 SISO decoding unit 113-5, the dimension 1 correction information memory 212-5, the dimension 2 soft-input value calculation unit 122-5, and the dimension 2 SISO decoding unit 123-5, and the dimension 2 correction information memory 222-5 are different from those of the second embodiment. Since other configurations are the same as those of the second embodiment, the same reference numerals are given and the description thereof will be omitted.

The dimension 1 correction information memory 212-5 and the dimension 2 correction information memory 222-5 are different from those of the second embodiment in that the dimension 1 correction information memory 212 and the dimension 2 correction information memory 222 further store correction information including low-reliability information indicating that whether or not reliability is low.

The low-reliability information is, for example, a flag (low-reliability flag) in which two values of a value indicating that reliability is low (for example, 1) and a value indicating that reliability is not low (for example, 0) are stored. For example, the low-reliability flag is set to 1 for a corrected location where low-reliability location information is stored in a low-reliability location information memory (the dimension 1 low-reliability location information memory 213-2 and the dimension 2 low-reliability location information memory 223-2), and is set to 0 for a corrected location where low-reliability location information is not stored.

The dimension 1 SISO decoding unit 113-5 and the dimension 2 SISO decoding unit 123-5 store the correction information including the low-reliability flag in FMEM (dimension 1 correction information memory 212-5 and dimension 2 correction information memory 222-5).

The dimension 1 soft-input value calculation unit 112-5 and the dimension 2 soft-input value calculation unit 122-5 further use the low-reliability flag to calculate a soft-input value.

Hereinafter, the case of dimension 1 (dimension 1 SISO decoding unit 113-5 and dimension 1 soft-input value calculation unit 112-5) will be described, but the same procedure is applicable to the dimension 2 (a dimension 2 SISO decoding unit 123-5 and the dimension 2 soft-input value calculation unit 122-5).

Before storing the correction information, the dimension 1 SISO decoding unit 113-5 refers to the dimension 1 low-reliability location information memory 213-2 to determine whether or not the corrected location indicated by the correction information is a low-reliability location. The dimension 1 SISO decoding unit 113-5 stores the correction information including the low-reliability flag having a value of 1 in the dimension 1 correction information memory 212-5 for the corrected location which is a low-reliability location. The dimension 1 SISO decoding unit 113-5 stores the correction information including the low-reliability flag having a value of 0 in the dimension 1 correction information memory 212-5 for the corrected location which is not a low-reliability location.

When calculating a soft-input value, when the correction information of the bit to be calculated is stored in the dimension 1 correction information memory 212-5, the dimension 1 soft-input value calculation unit 112-5 calculates a soft-input value $L_{in}$ by using a channel value according to the value of a low-reliability flag included in the stored correction information. For example, the dimension 1 soft-input value calculation unit 112-5 sets a channel value $L=L_L$ when the low-reliability flag=1, and sets the channel value $L=L_H$ when the low-reliability flag=0.

When the correction information of the bit to be calculated is not stored in the dimension 1 correction information memory 212-5, the dimension 1 soft-input value calculation unit 112-5 refers to the dimension 1 low-reliability location information memory 213-2 to set the channel value $L=L_L$ when low-reliability location information corresponding to the location of the bit is stored, and set the channel value $L=L_H$ when not stored.

The case where the correction information of the bit to be calculated is not stored in the dimension 1 correction information memory 212-5 is the case where an error is found for the first time for the bit in the component code decoding processing to be repeatedly executed, for example.

The same Equations (2) to (4) as in the second embodiment can be used for the calculation of the soft-input value $L_{in}$ using the determined channel value L.

As described above, in the present embodiment, the low-reliability flag stored in FMEM (correction information memory) is prioritized over the low-reliability location information stored in LMEM (low-reliability location information memory) to determine whether or not reliability is low. With such a configuration, for example, it is possible to avoid an inconsistency in the determination of a low-reliability location, which may occur when LMEM is initialized independently in the dimension 1 (row) and the dimension 2 (column), and correction ability can be improved. Hereinafter, a method for avoiding such inconsistency will be described.

For example, the low-reliability location may be concentrated on a specific component code, and the number of pieces of low-reliability location information to be stored may be larger than the number of pieces of low-reliability location information determined by the determination unit 241-2. In such a case, the low-reliability location information exceeding the number of pieces of low-reliability location information is not stored in LMEM. Therefore, for example, when LMEM is initialized independently in the dimension 1 (row) and the dimension 2 (column), in some cases, an entry exists in one dimension LMEM, but an entry does not exist in another dimension LMEM.

Figure 24:
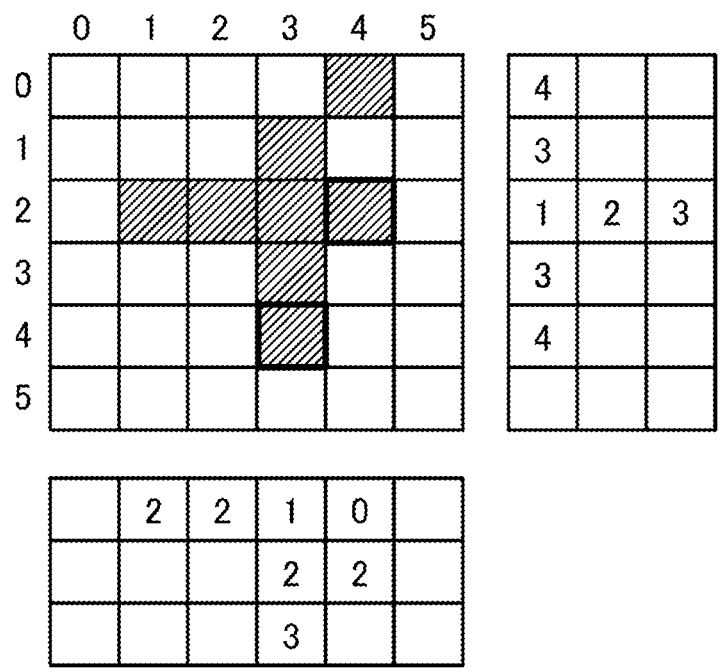
FIG. 24 is a diagram illustrating an example of a situation in which a discrepancy in low-reliability location information occurs.

FIG. 24 is a diagram illustrating an example of such a situation. FIG. 24 shows an example when the number of pieces of low-reliability location information for each component code is three. In FIG. 24, the locations surrounded by the thick frame lines (row 2 and column 4, and row 4 and column 3) represent the locations where a discrepancy occurs.

For example, for the component codes in the second row, the locations corresponding to the first, second, third, and fourth columns are low-reliability locations, but since the number of pieces of low-reliability location information exceeds 3, low-reliability location information is not stored for the location corresponding to the fourth column. Therefore, a discrepancy occurs with the low-reliability location information (indicating that the second row has low reliability) corresponding to the component code in the fourth column of the dimension 2 (column) LMEM.

When it is determined whether or not a location has low reliability by referring only to each dimension LMEM that can be initialized independently, an inconsistency in determining that one dimension component code has low reliability and that another dimension component code has high reliability can occur even though the location is the same. As a result, the correction ability may be deteriorated.

In order to reduce the occurrence of such an inconsistency in the determination, in the present embodiment, for example, for the location where an error is first found, it is determined whether or not the location has low reliability depending on whether or not an entry exists in LMEM, and a low-reliability flag corresponding to the determination result is stored in the correction information memory. Thereafter, it is determined whether or not the location has low reliability by using the stored low-reliability flag. As a result, an inconsistency in the determination of a low-reliability location can be prevented, and deterioration of the correction ability can be prevented.

In a configuration in which the number of pieces of low-reliability location information is determined according to the number of component codes and the like in order to reduce the total capacity of the memory area of LMEM, when low-reliability locations exceeding the number of pieces of low-reliability location information are generated as described above, the possibility of occurrence of a discrepancy in the low-reliability location information among dimensions can be increased. According to at least one embodiment, even when such a discrepancy occurs, it is possible to reduce the occurrence of a discrepancy in the determination by using the low-reliability flag.

The function using a low-reliability flag as in at least one embodiment is also applied to a configuration in which the number of pieces of low-reliability location information is not determined according to the number of component codes and the like, that is, a configuration in which the determination unit 241-2 is not provided.

In the present embodiment, the memory area for storing the low-reliability flag increases, but the influence on the amount of reduction in the memory capacity of the correction information memory is small. For example, the capacity of the memory area to be increased is only the capacity corresponding to (1 bit of the low-reliability flag)×(number of component codes)×(number of pieces of correction information for each component code).

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
 a non-volatile memory arranged to store an N-dimensional error-correction code in which at least one of symbols constituting a code is protected by N component code groups (N is an integer of 2 or more);
 a read information memory arranged to store read information to be read from the non-volatile memory;
 a syndrome value memory arranged to store a syndrome value corresponding to each of M component codes ($1 \leq i \leq N$, where ni is the number of component codes included in an i-dimensional component code group, where M is a sum of ni) calculated from the read information stored in the read information memory;
 a correction information memory arranged to store, for the a-th component code ($1 \leq a \leq ni$) of the i-dimensional component code group, a-th correction information indicating a location corrected by decoding processing of an a-th component code;
 a reliability information memory arranged to store a-th reliability information indicating reliability of a decoded word obtained in the decoding processing of the a-th component code; and
 a memory controller configured to:
  determine the number of pieces of correction information, the number of pieces of correction information being the number of pieces of the a-th correction information for each of the M component codes according to a value based on the number of component codes included in the first to N-th dimensional component code groups;

determine a correction information address, the correction information address being an address on the correction information memory of the a-th correction information for each of the M component codes based on the number of pieces of the correction information;

calculate an a-th soft-input value, the a-th soft-input value being a soft-input value for the a-th component code based on the a-th correction information, the a-th reliability information, and a syndrome value of the a-th component code;

calculate a decoded word of the a-th component code, the a-th correction information, and the a-th reliability information by inputting the a-th soft-input value and executing the decoding processing of the a-th component code;

store the calculated a-th correction information and b-th correction information indicating a corrected location of a b-th component code ($1 \leq b \leq nj$) in a j-th dimension ($j \neq i$, $1 \leq j \leq N$) corrected by the decoding processing of the i-th component code in the correction information address of the correction information memory;

store the calculated a-th reliability information in the reliability information memory; and output an output decoded word calculated from the read information, the correction information, and M pieces of the a-th reliability information.

2. The memory system according to claim 1, further comprising:

a low-reliability location information memory arranged to store a-th low-reliability location information indicating a location of the read information determined to have low reliability among pieces of the read information for each of the M component codes, wherein the memory controller is configured to:

determine the number of pieces of low-reliability location information, the number of pieces of low-reliability location information being the number of pieces of the a-th low-reliability location information for each of the M component codes according to the value based on the number of component codes;

determine a low-reliability location information address, the low-reliability location information address being an address on the low-reliability location information memory of the a-th low-reliability location information for each of the M component codes based on the number of pieces of the low-reliability location information;

calculate the a-th low-reliability location information before calculating the a-th soft-input value;

store the calculated a-th low-reliability location information in the low-reliability location information address of the low-reliability location information memory; and calculate the a-th soft-input value based on the a-th correction information, the a-th reliability information, the syndrome value of the a-th component code, and the a-th low-reliability location information.

3. The memory system according to claim 1, wherein the memory controller is configured to determine the number of pieces of the correction information whose value is smaller as the value based on the number of component codes becomes larger.

4. The memory system according to claim 1, wherein the value based on the number of component codes is a value of M.

5. The memory system according to claim 1, wherein the value based on the number of component codes is the number of uncorrected component codes among the M component codes.

6. A memory system comprising:

a non-volatile memory arranged to store an N-dimensional error-correction code in which at least one of symbols constituting a code is protected by N component code groups (N is an integer of 2 or more);

a read information memory arranged to store read information to be read from the non-volatile memory;

a syndrome value memory arranged to store a syndrome value corresponding to each of the M component codes ($1 \leq i \leq N$, ni is the number of component codes included in an i-dimensional component code group, where M is the sum of ni) calculated from the read information stored in the read information memory;

a correction information memory arranged to store, for the a-th component code ($1 \leq a \leq ni$) of the i-dimensional component code group, a-th correction information indicating a location corrected by decoding processing of an a-th component code;

a reliability information memory arranged to store a-th reliability information indicating reliability of a decoded word obtained in the decoding processing of the a-th component code;

a low-reliability location information memory arranged to store a-th low-reliability location information indicating a location of the read information determined to have low reliability among pieces of the read information for each of the M component codes; and a memory controller configured to:

determine the number of pieces of low-reliability location information, the number of pieces of low-reliability location information being the number of pieces of a-th low-reliability location information for each of the M component codes according to a value based on the number of component codes included in the first to N-th dimensional component code groups;

determine a low-reliability location information address, the low-reliability location information address being an address on the low-reliability location information memory of the a-th low-reliability location information for each of the M component codes based on the number of pieces of the low-reliability location information;

calculate the a-th low-reliability location information before calculating an a-th soft-input value, the a-th soft-input value being a soft-input value for the a-th component code;

store the calculated a-th low-reliability location information in the low-reliability location information address of the low-reliability location information memory;

calculate the a-th soft-input value based on the a-th correction information, the a-th reliability information, a syndrome value of the a-th component code, and the a-th low-reliability location information;

calculate a decoded word of the a-th component code, the a-th correction information, and the a-th reliability information by inputting the a-th soft-input value and executing the decoding processing of the a-th component code;

store the calculated a-th correction information and b-th correction information indicating a corrected location of a b-th component code ($1 \leq b \leq nj$) in a j-th dimension ($j \neq i$, $1 \leq j \leq N$) corrected by the decoding processing of the i-th component code in the correction information memory;

store the calculated a-th reliability information in the reliability information memory; and output an output decoded word calculated from the read information, the correction information, and M pieces of the a-th reliability information.

7. The memory system according to claim 6, wherein the memory controller is further configured to:

store the a-th correction information including low-reliability information indicating whether or not reliability of correction is low in the correction information memory when the a-th low-reliability location information indicating the same location as a location indicated by the a-th correction information is stored in the low-reliability location information memory; and calculate the a-th soft-input value by using the low-reliability information instead of the a-th low-reliability location information when the low-reliability information indicating that the reliability of the a-th correction information is low is included.

8. The memory system according to claim 6, wherein the memory controller is configured to determine the number of pieces of low-reliability location information whose value is smaller as the value based on the number of component codes becomes larger.

9. The memory system according to claim 6, wherein the value based on the number of component codes is a value of M.

10. The memory system according to claim 6, wherein the value based on the number of component codes is the number of uncorrected component codes among the M component codes.

11. A memory control method, for performing by a memory controller configured to control a non-volatile memory storing an N-dimensional error-correction code in which at least one of symbols constituting a code is protected by N component code groups (N is an integer of 2 or more), the method comprising:

storing read information to be read from the non-volatile memory in a read information memory;

storing a syndrome value corresponding to each of the M component codes ($1 \leq i \leq N$, ni is the number of component codes included in an i-dimensional component code group, where M is the sum of ni) calculated from the read information stored in the read information memory in a syndrome value memory;

storing, for the a-th component code ($1 \leq a \leq ni$) of the i-dimensional component code group, a-th correction information indicating a location corrected by decoding processing of an a-th component code in a correction information memory;

storing a-th reliability information indicating reliability of a decoded word obtained in the decoding processing of the a-th component code in a reliability information memory; and determining the number of pieces of correction information, the number of pieces of correction information being the number of pieces of the a-th correction information for each of the M component codes according to a value based on the number of component codes included in the first to N-th dimensional component code groups;

determining a correction information address, the correction information address being an address on the correction information memory of the a-th correction information for each of the M component codes based on the number of pieces of the correction information;

calculating an a-th soft-input value, the a-th soft-input value being a soft-input value for the a-th component code based on the a-th correction information, the a-th reliability information, and a syndrome value of the a-th component code;

calculating a decoded word of the a-th component code, the a-th correction information, and the a-th reliability information by inputting the a-th soft-input value and executing decoding processing of the a-th component code;

storing the calculated a-th correction information and b-th correction information indicating a corrected location of the b-th component code ($1 \leq b \leq nj$) in a j-th dimension ($j \neq i$, $1 \leq j \leq N$) corrected by the decoding processing of the i-th component code in the correction information address of the correction information memory;

storing the calculated a-th reliability information in the reliability information memory; and outputting an output decoded word calculated from the read information, the correction information, and M pieces of the a-th reliability information.

12. A memory control method by a memory controller configured to control a non-volatile memory storing an N-dimensional error-correction code in which at least one of symbols constituting a code is protected by N component code groups (N is an integer of 2 or more), the method comprising:

storing read information to be read from the non-volatile memory in a read information memory;

storing a syndrome value corresponding to each of the M component codes ($1 \leq i \leq N$, ni is the number of component codes included in an i-dimensional component code group, where M is the sum of ni) calculated from the read information stored in the read information memory in a syndrome value memory;

storing, for the a-th component code ($1 \leq a \leq ni$) of the i-dimensional component code group, a-th correction information indicating a location corrected by decoding processing of an a-th component code in the correction information memory;

storing a-th reliability information indicating reliability of a decoded word obtained in the decoding processing of the a-th component code in a reliability information memory;

storing a-th low-reliability location information indicating a location of the read information determined to have low reliability among pieces of the read information in a low-reliability location information memory for each of the M component codes;

determining the number of pieces of low-reliability location information, the number of pieces of low-reliability location information being the number of pieces of the a-th low-reliability location information for each of the M component codes according to a value based on the number of component codes included in the first to N-th dimensional component code groups;

determining a low-reliability location information address, the low-reliability location information address being an address on the low-reliability location information memory of the a-th low-reliability location information for each of the M component codes based on the number of pieces of low-reliability location information;

calculating the a-th low-reliability location information before calculating an a-th soft-input value, the a-th soft-input value being a soft-input value for the a-th component code;

storing the calculated a-th low-reliability location information in the low-reliability location information address of the low-reliability location information memory;

calculating the a-th soft-input value based on the a-th correction information, the a-th reliability information, a syndrome value of the a-th component code, and the a-th low-reliability location information;

calculating a decoded word of the a-th component code, the a-th correction information, and the a-th reliability information by inputting the a-th soft-input value and executing decoding processing of the a-th component code;

storing the calculated a-th correction information and b-th correction information indicating a corrected location of a b-th component code ($1 \leq b \leq nj$) in a j-th dimension ($j \neq i$, $1 \leq j \leq N$) corrected by the decoding processing of the i-th component code in the correction information memory;

storing the calculated a-th reliability information in the reliability information memory; and outputting an output decoded word calculated from the read information, the correction information, and M pieces of the a-th reliability information.

* * * * *